United States Patent
Sugaya

(10) Patent No.: US 10,721,732 B2
(45) Date of Patent: Jul. 21, 2020

(54) RADIO COMMUNICATION SYSTEM, DEVICE AND METHOD FOR RADIO COMMUNICATION, AND COMPUTER PROGRAM

(71) Applicant: Sony Corporation, Tokyo (JP)

(72) Inventor: Shigeru Sugaya, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/850,620

(22) Filed: Dec. 21, 2017

(65) Prior Publication Data
US 2018/0139754 A1    May 17, 2018

Related U.S. Application Data

(63) Continuation of application No. 14/750,068, filed on Jun. 25, 2015, now Pat. No. 9,888,472, which is a
(Continued)

(30) Foreign Application Priority Data

Mar. 4, 2002  (JP) .................................. 2002-057839
May 28, 2002  (JP) .................................. 2002-154312

(51) Int. Cl.
*H04W 72/04*  (2009.01)
*H04W 48/12*  (2009.01)
(Continued)

(52) U.S. Cl.
CPC ....... *H04W 72/0446* (2013.01); *H04W 48/12* (2013.01); *H04W 48/16* (2013.01); *H04W 74/006* (2013.01)

(58) Field of Classification Search
CPC ............. H04W 72/0446; H04W 48/16; H04W 74/006; H04W 48/12
(Continued)

(56) References Cited

U.S. PATENT DOCUMENTS 3,809,815 A  5/1974  Reed et al.
4,013,840 A  3/1977  Anderson
(Continued)

FOREIGN PATENT DOCUMENTS

EP    286614    10/1988
EP    0912015    4/1999
(Continued)

OTHER PUBLICATIONS

Motorola, Home Networking with IEEE 802.15.4: A Developing Standard for Low-Rate Wireless Personal Area Network, Aug. 2002, pp. 70-77.
(Continued)

*Primary Examiner* — Faisal Choudhury
(74) *Attorney, Agent, or Firm* — Lerner, David, Littenberg, Krumholz & Mentlik, LLP

(57) ABSTRACT

A radio communication device which manages a network defines a predetermined transmission frame cycle, allocates in the frame specific access slots as timing with which the individual radio communication devices in the network concerned receive a transmission, puts the information of the allocation in a beacon signal, and transmits the signal. Each radio communication device performs receiving operation at access slots specific to the device itself defined by the beacon signal. When information transmission is made between arbitrary communication devices in the network, access slots for the device which is to receive the information are used.

14 Claims, 15 Drawing Sheets

Related U.S. Application Data continuation of application No. 14/137,016, filed on Dec. 20, 2013, now Pat. No. 9,185,702, which is a continuation of application No. 12/378,957, filed on Feb. 20, 2009, now Pat. No. 8,654,713, which is a continuation of application No. 10/475,161, filed as application No. PCT/JP03/02306 on Feb. 28, 2003, now Pat. No. 7,545,826.

(51) Int. Cl.
*H04W 48/16* (2009.01)
*H04W 74/00* (2009.01)

(58) Field of Classification Search
USPC .......................................................... 370/329
See application file for complete search history.

(56) References Cited

U.S. PATENT DOCUMENTS

| | | | |
|---|---|---|---|
| 4,020,289 A | 4/1977 | Anderson | |
| 4,262,171 A | 4/1981 | Schneider et al. | |
| 5,241,542 A | 8/1993 | Natarajan et al. | |
| 5,392,287 A | 2/1995 | Tiedemann, Jr. et al. | |
| 5,444,696 A | 8/1995 | Petranovich | |
| 5,539,730 A | 7/1996 | Dent et al. | |
| 5,553,317 A | 9/1996 | Hara et al. | |
| 6,041,051 A | 3/2000 | Doshi et al. | |
| 6,069,880 A | 5/2000 | Owen et al. | |
| 6,324,184 B1 | 11/2001 | Hou et al. | |
| 6,400,928 B1 | 6/2002 | Khullar et al. | |
| 6,466,587 B1 | 10/2002 | Sugaya | |
| 6,717,926 B1* | 4/2004 | Deboille | H04W 48/12 370/328 |
| 6,735,446 B1 | 5/2004 | Iwata et al. | |
| 6,751,248 B1 | 6/2004 | Tan | |
| 6,810,022 B1 | 10/2004 | Young | |
| 6,980,541 B2* | 12/2005 | Shvodian | H04W 74/02 370/278 |
| 7,031,716 B2 | 4/2006 | Wong et al. | |
| 7,082,131 B2 | 7/2006 | Yamauchi et al. | |
| 7,110,380 B2 | 9/2006 | Shvodian | |
| 7,173,919 B1 | 2/2007 | Dabak | |
| 7,177,652 B1 | 2/2007 | Hopper et al. | |
| 7,428,224 B2 | 9/2008 | Masaoka et al. | |
| 7,447,180 B2 | 11/2008 | Jeong et al. | |
| 7,826,475 B2 | 11/2010 | Lee et al. | |
| 8,374,202 B2 | 2/2013 | Doi et al. | |
| 2002/0016151 A1* | 2/2002 | Romans | H04L 41/00 455/13.4 |
| 2002/0071449 A1 | 6/2002 | Ho et al. | |
| 2002/0105970 A1* | 8/2002 | Shvodian | H04W 16/14 370/468 |
| 2002/0123345 A1* | 9/2002 | Mahany | H04W 4/80 455/432.1 |
| 2003/0003900 A1* | 1/2003 | Goss | H04M 3/54 455/417 |
| 2003/0012176 A1* | 1/2003 | Kondylis | H04W 28/16 370/348 |
| 2003/0125025 A1* | 7/2003 | Lim | H04W 72/1263 455/435.1 |
| 2003/0152059 A1* | 8/2003 | Odman | H04B 1/69 370/338 |
| 2004/0013127 A1* | 1/2004 | Shvodian | H04W 74/02 370/442 |
| 2012/0201154 A1 | 8/2012 | Chandrasekhar et al. | |
| 2016/0353344 A1* | 12/2016 | Deivasigamani | H04W 36/14 |

FOREIGN PATENT DOCUMENTS

| | | |
|---|---|---|
| EP | 0924896 A1 | 6/1999 |
| EP | 0 939 523 A2 | 9/1999 |
| JP | 56-086547 | 7/1981 |
| JP | 11-239114 A | 8/1999 |

OTHER PUBLICATIONS

Communication pursuant to Article 94 (3) EPC, from EP Application No. 03743521.1-2412, dated Jul. 3, 2012.

* cited by examiner

| BEACON IDEN- TIFIER | DEVICE IDEN- TIFIER | NETWORK SYNCHRO- NIZATION PARAMETER | MAXIMUM TRANSMISSION POWER INFORMATION | SLOT ALLOCATION INFORMATION | ACCESS SLOT ALLOCATION INFORMATION |

FIG. 12

| BEACON IDENTIFIER | DEVICE IDENTIFIER | NETWORK SYNCHRONIZATION PARAMETERS | MAXIMUM TRANSMISSION POWER INFORMATION | SLOT ALLOCATION INFORMATION | ACCESS SLOT ALLOCATION INFORMATION | BROADCAST SLOT ARRANGEMENT INFORMATION |
|---|---|---|---|---|---|---|

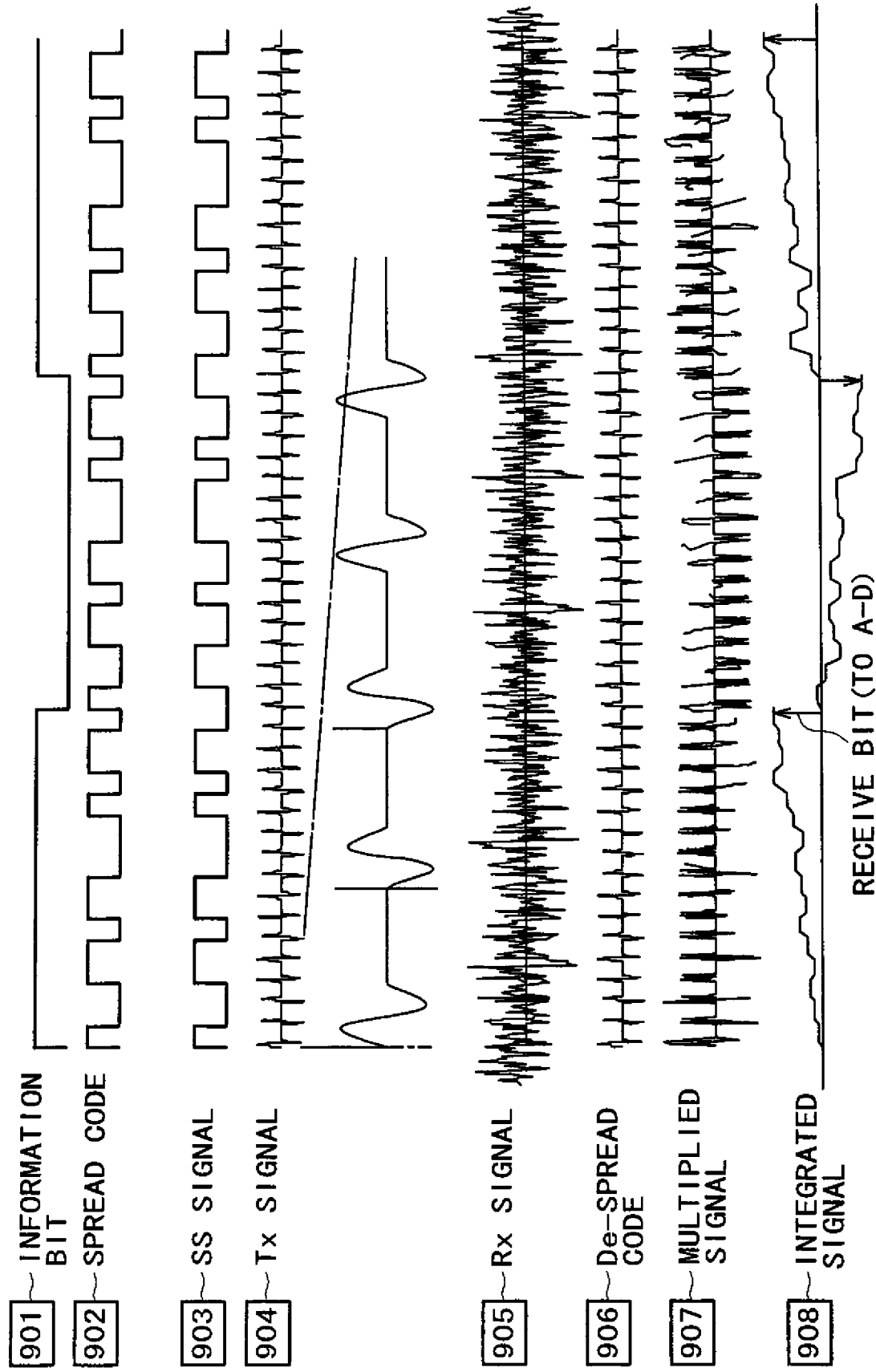

RADIO COMMUNICATION SYSTEM, DEVICE AND METHOD FOR RADIO COMMUNICATION, AND COMPUTER PROGRAM

CROSS-REFERENCE TO RELATED APPLICATIONS

The present application is a continuation of U.S. patent application Ser. No. 14/750,068, filed Jun. 25, 2015, which is a continuation of U.S. patent application Ser. No. 14/137, 016, filed Dec. 20, 2013, (U.S. Pat. No. 9,185,702) which is a continuation of U.S. patent application Ser. No. 12/378, 957, filed Feb. 20, 2009 (U.S. Pat. No. 8,654,713), which is a continuation of U.S. patent application Ser. No. 10/475, 161, filed Oct. 16, 2003 (U.S. Pat. No. 7,545,826), which is a National State filing of PCT/JP03/02306 filed Feb. 28, 2003, which claims priority of Japanese Patent Application No. 2002-057839, filed on Mar. 4, 2002, and Japanese Patent Application No. 2002-154312, filed May 28, 2002, the disclosures of which are hereby incorporated by reference herein.

TECHNICAL FIELD

The present invention in general relates to a radio communication system, a device and a method for radio communication, and a computer program wherein communication is conducted among a plurality of radio stations. The present invention more particularly relates to a radio communication system wherein a network is set up with a specific transmission frame cycle, and a device and a method for radio communication and a computer program which work in such a wireless network.

In more detail, the present invention relates to a radio communication system, a device and a method for radio communication, and a computer program wherein asynchronous communication is conducted with less delay in a wireless network which operates with a specific transmission frame cycle. The present invention more particularly relates to a radio communication system, a device and a method for radio communication, and a computer program wherein reception processing and management of information therefor are simplified in a wireless network which operates with a specific transmission frame cycle.

BACKGROUND ART

A plurality of computers can be connected together to constitute LAN (Local Area Network). In LAN, information in the form of file, data, and the like as well as peripheral devices, such as a printer, can be shared. Further, information exchange, including transfer of electronic mail and data contents, can be carried out.

Conventionally, LANs (Local Area Networks) have been usually set up as wired networks using optical fibers, coaxial cables, or twisted pair wires. In this case, line installation work is required and this makes it difficult to readily set up a network and complicates cable routing. Even if LAN is set up, the moving ranges of equipment are limited by cable length and this makes the LAN inconvenient. For this reason, as a system which liberates users from the troublesomeness of wiring of conventional wired LANs, wireless LAN has received attention. With wireless LAN, most wires and cables in work spaces, such as offices, can be omitted and such communication terminals as personal computers (PCs) can be relocated with comparative ease.

Recently, demands for wireless LAN systems have sharply grown as their speed is enhanced and their prices are reduced. More recently, introduction of personal area networks (PANs) has been considered. This is a small-scale wireless network set up for information communication among a plurality of pieces of electronic equipment present by people's side. For example, varied radio communication systems are defined which use frequency bands (e.g. 2.4-GHz band and 5-GHz band) requiring no permission from competent authorities.

For example, IEEE802.15.3 is performing standardizing activities for fast wireless personal area networks over 20 Mbps. The responsible section is forging ahead with standardization of a network based on the PHY layer using signals mainly in the 2.4-GHz band.

In this type of wireless personal network, one radio communication device operates as a control station called "coordinator." A personal area network is setup with in a range of 10 or less meters from the coordinator at the center. The coordinator transmits beacon signals with a specified cycle and this cycle of beacons is taken as a transmission frame cycle. In each transmission frame cycle, time slots used by individual radio communication devices are allocated.

One of allocating methods for time slots which are presently adopted is, "Guaranteed Time Slot (GTS)." This assumes such a communication method that a required capacity of transmission is guaranteed and yet transmission bands are dynamically allocated.

For example, for the MAC layer standardized by IEEE802.15.3, contention access period (CAP) and contention free period (CFP) are provided. When asynchronous communication is conducted, contention access periods are used to exchange short data or command information. When stream communication is conducted, time slots are dynamically allocated by guaranteed time slot (GTS) within contention free periods and bandwidth reservation transmission is made.

The MAC layer portion standardized by IEEE802.15.3 is so defined that the portion is applicable not only to the PHY layer using signals in the 2.4-GHz band but also as a standard specification for other PHY layers. Further, for the PHY layer standardized by IEEE802.15.3, standardizing activities are being started to use other PHY layers than the PHY layer using signals in the 2.4-GHz band.

Recently, wireless LAN (Local Area Network) systems using SS (Spread Spectrum) have been put into practical use. Further, the UWB (Ultra Wide Band) transmission method to which SS is applied has been proposed for applications for PAN and the like.

DS (Direct Spread) is a type of SS. In DS, at the transmitting end, information signals are multiplied by a series of random code called PN (Pseudo Noise) code to spread the occupied band. At the receiving end, the received spread information signals are multiplied by the PN code to de-spread and the information signals are thereby reproduced. The UWB transmission method is such that the rate of spreading of information signals is increased to the maximum. In the UWB method, data is spread, for example, from 2 GHz to as ultra high a frequency band as 6 GHz in transmission/reception, and high-speed data transmission is thereby accomplished.

In UWB, trains of impulse signals having as very short a period as several hundred picoseconds are used to constitute information signals, and trains of these signals are transmitted and received. Its occupied bandwidth is on the order of gigahertz and the value obtained by dividing the occupied bandwidth by its center frequency (e.g. 1 GHz to 10 GHz) is substantially equal to 1. This bandwidth is ultra wide even as compared with bandwidths usually used in wireless LAN based on so-called W-CDMA, cdma2000, SS (Spread Spectrum), or OFDM (orthogonal Frequency Division Multiplexing).

FIG. 17 illustrates an example of data transmission using UWB. Inputted information 901 is spread by a spreading sequence 902. In some systems using UWB, this multiplication of spreading sequence may be skipped.

The information signal 903 which underwent spread spectrum is modulated using impulse signals in UWB (wavelet pulses) (905). Modulation methods under study include PPM (Pulse Position Modulation), phase modulation (biphase modulation), and amplitude modulation.

The impulse signals used in UWB are very thin pulses; therefore, they use very wide bands in terms of frequency spectrum. As a result, inputted information signals have only power at the noise level or lower levels in each frequency domain.

In the figure, the Rx signal 905 is fraught with noises; however, it can be detected by computing the value of correlation between the Rx signal and the impulse signal. Further, in many systems, signal spreading is performed, and many impulse signals are transmitted for one bit of transmitted information. Therefore, the reception correlative value 907 of the impulse signal can be integrated by an amount equivalent to the spreading sequence length (908). As a result, detection of the Tx signal is further facilitated.

Signals spread by the UWB transmission method have only power at the noise level or lower levels in each frequency domain. On this account, communication systems using the UWB transmission method are comparatively easy to make to coexist with communication systems based on the other methods than UWB.

According to the specifications for the PHY layer using signals in the 2.4-GHz band, standardized by IEEE802.15.3, a plurality of radio communication systems exist in the same frequency band. Therefore, compatibility with these systems must be taken into account.

Meanwhile, trains of impulse signals used in the UWB radio communication method do not have a specific frequency carrier and carrier sense is difficult to perform thereon. Therefore, if the UWB radio communication method is applied as the PHY layer of IEEE802.15.3, a problem arises. Since there is not a specific carrier signal, it is comparatively difficult to exercise access control using carrier sense standardized by the section (Carrier Sense Multiple Access). In such cases, access control by time-division multiplexing is often resorted to.

This involves a problem that it is difficult to provide contention access periods (CAP) in the MAC layer standardized by IEEE802.15.3. At a radio communication device as the source of data transmission, a procedure must be followed even if asynchronous communication is conducted. The procedure is such that bandwidth reservation is made in a contention free period (CFA) before information transmission is made. This causes significant delay in transmission processing.

In conventional access control methods using carrier sense, a radio communication device as the destination of data transmission must always wait for reception in asynchronous communication. This brings a great disadvantage in terms of power consumption, especially, where a communication device is constituted as battery-operated equipment such as portable terminal. These problems do not arise only where hierarchic topology (e.g. "control station" and "communicating station" controlled by the control station) is constructed like the MAC layer defined by IEEE802.15.3. The problems of the same kind also arise where flat topology without a control station controlling a network, like ad hoc network, is constructed.

DISCLOSURE OF THE INVENTION

An object of the present invention is to provide an excellent radio communication system, device and method for radio communication, and computer program wherein asynchronous communication can be conducted with less delay in a wireless network which operates with a specific transmission frame cycle.

A further object of the present invention is to provide an excellent radio communication system, device and method for radio communication, and computer program wherein reception processing and management of information therefor can be simplified in a wireless network which operates with a specific transmission frame cycle.

The present invention has been made with the above-mentioned problems taken into account. A first aspect thereof is a radio communication system wherein information transmission is made with a specific transmission frame cycle, wherein a radio communication device defines a transmission frame cycle with a specified cycle, allocates reception regions specific to the individual radio communication devices in its own network in the transmission frame cycle, and transmits reception region allocation information to the individual radio communication devices, and the individual radio communication devices perform reception processing in their own reception regions according to the reception region allocation information, and, in data transmission, use the reception regions for stations as the destinations of transmission to perform transmission processing.

However, "system" described here refers to a logical aggregate of a plurality of devices (or functional modules which perform specific functions), irrespective of whether each device or functional module is placed in a single enclosure or not.

In the radio communication system according to the first aspect of the present invention, a wireless network operates with a predetermined transmission frame cycle. A plurality of access slots for an arbitrary communication device to receive information are placed in these frames. Thus, random-accessible wireless transmission frames can be set up and a frame structure suitable for asynchronous communication can be created.

More specifically, reception slots for each radio communication device in a wireless network to receive information destined for the radio communication device itself are determined in advance and reception processing is performed only at these slots. Thus, data transmission/reception processing is simplified and each communication device need not keep on waiting for reception, which contributes to reduction in the power consumption of each communication device.

In this case, when information transmission is made without specifying any destination as in broadcasting, the same information must be repeatedly transmitted at the reception slots for all the radio communication devices. This is wasteful.

To cope with this, reception regions common to all the radio communication devices in a network may be allocated and be transmitted to the devices as reception region allocation information. In this case, each radio communication device performs reception processing in reception regions for the device itself and in common reception regions. Further, for a specific destination of transmission, each radio communication device uses the reception regions for that station in transmission processing. For unspecified destinations of transmission, the radio communication device uses common reception regions in transmission processing.

That is, reception regions specific to each radio communication device in a network and reception regions common to all the radio communication devices in the network are provided. Thus, both unicast and broadcast can be effectively performed in a network.

Further, the arrangement of reception regions specific to each radio communication device and common reception regions can be modified as required according to the load of communications traffic or the like in the network. Thus, communication in a wireless network can be efficiently controlled.

A second aspect of the present invention is a radio communication device or a radio communication method for managing a wireless network, comprising:

a management information acquiring means or step for acquiring management information in its own network;

a reception region allocating means or step for allocating reception regions specific to each station participating in its own network according to the management information; and an allocation information transmitting means or step for transmitting the allocation information of reception regions for each station to the station in its own network.

Here, a radio communication device, for example, a control station, which manages a wireless network sets a radio frame cycle for its own network. A beacon signal is placed at the start of a radio frame cycle, and contention access periods and contention free periods are placed thereafter. For example, a plurality of access slots can be placed in a contention access period or contention free period, and each access slot can be allocated to each station in the network. Then, the radio communication device which manages the wireless network describes allocation information for access slots in a beacon signal and transmits the signal. As a result, each station in the wireless network can learn reception timing for the station itself and can further learn the timing of data transmission to other stations.

More specifically, the radio communication device which manages the wireless network defines a frame with a specified cycle and places in the frame a plurality of access slots for an arbitrary communication device to receive information. Thus, random-accessible radio transmission frames can be set up and a frame structure suitable for asynchronous communication can be created.

Therefore, each radio communication device in the wireless network performs reception processing only at reception slots allocated thereto and thereby receives information destined for the device itself. Thus, data transmission/reception processing is simplified, and devices need not keep on waiting for reception, which contributes to reduction in the power consumption of the devices.

Where information transmission is made without specifying any destination as in broadcasting, the same information must be repeatedly transmitted at reception slots for all the radio communication devices. This is wasteful.

To cope with this, in addition to allocating reception regions specific to each station participating in its own network, the reception region allocating means or step may further allocate reception regions common to all the stations in the network.

That is, reception regions specific to each radio communication device and reception regions common to all the radio communication devices in the network are provided. Thus, unicast and broadcast can be efficiently performed in a network.

Further, the arrangement of reception regions specific to each radio communication device and common reception regions can be modified as required according to the load of communications traffic or the like in the network. Thus, communication in a wireless network can be efficiently controlled.

A third aspect of the present invention is a radio communication device or a radio communication method for conducting radio communication in a wireless network which operates with a radio frame cycle, comprising:

a receiving means or step for receiving radio data through the wireless network;

a reception region allocation information acquiring means or step for acquiring information related to reception regions allocated to each radio communication device in the wireless network; and a reception controlling means or step for starting reception processing in response to arrival of a reception region allocated to the radio communication device itself.

A fourth aspect of the present invention is a radio communication device or a radio communication method for conducting radio communication in a wireless network which operates with a radio frame cycle, comprising:

a receiving means or step for receiving radio data through the wireless network;

a transmitting means or step for transmitting radio data through the wireless network;

a reception region allocation information managing means or step for acquiring and managing information related to reception regions allocated to each radio communication device in the wireless network;

a destination of transmission reception region acquiring means or step for reading from the reception region allocation information managing means reception regions allocated to a station as the destination of transmission in the wireless network; and a transmission controlling means or step for starting transmission processing in response to arrival of a reception region allocated to the destination of transmission.

In the wireless network related to the present invention, a radio communication device, such as a control station, which manages the network defines a frame with a predetermined cycle. The radio communication device then places in the frames a plurality of access slots for an arbitrary communication device to receive information. Thus, a random-accessible radio transmission frame can be set up, and a frame structure suitable for asynchronous communication can be created. More specifically, the control station allocates unique access slots to each radio communication device in the network and transmits the state of allocation in beacon signals. Thus, at every device in the network, access control can be uniquely exercised.

Further, each radio communication device in the wireless network stores access slot information described in beacon signals from the control station and transmits and receives information based on the access slot information. Thus, access control according to instructions from the control station can be exercised with ease.

For example, each radio communication device performs receiving operation at access slots allocated to the device itself based on beacon signals. Thus, reception processing can be simplified. Further, each radio communication device need not keep on waiting for reception, and the power consumption thereof can be reduced.

Each radio communication device can easily grasp the timing of reception of other radio communication devices only by receiving beacon signals from the control station. More specifically, each communication device performs timing synchronization for the arrangement of access slots based on beacon signals and thereby synchronizes itself with the timing in the network. Thus, reception processing can be simplified. When a radio communication device makes data transmission, the device makes information transmission at access slots for the device which is to receive the information. Thus, asynchronous communication excellent in random accessibility can be implemented.

Even if each radio communication device fails to receive a beacon signal from the control station, the device can infer the arrangement of access slots for the device itself. This is done by receiving all the access slots in a frame and receiving communication from other radio equipment.

When a radio communication device participates in a wireless network, a radio communication device, such as a control station, which manages the network allocates access slots to each communication device constituting the network in a unified way. Thus, transmission bands can be efficiently allocated.

Access slots at which the control station itself also receives a transmission are provided. Thus, if a radio communication device participates in the wireless network, the access slots can be used to perform operation for participation. As a result, the transmission line can be utilized with efficiency.

The portions other than access slots can be arranged as allocated slots. Thus, bandwidth reservation transmission suitable for stream transmission utilizing contention free regions can be made with ease.

When information transmission is made without specifying any destination as in broadcasting, the same information must be repeatedly transmitted at reception slots for all the radio communication devices. This is wasteful.

To cope with this, each radio communication device performs reception processing in reception regions for the device itself and in common reception regions. Further, for specific destinations of transmission, each radio communication device uses reception regions for the destinations of transmission to perform transmission processing. For unspecified destinations of transmission, the radio communication device uses common reception regions to perform transmission processing.

More specifically, reception regions specific to each radio communication device and reception regions common to all the radio communication devices in the network are provided. Thus, unicast and broadcast can be efficiently performed in a network.

A fifth aspect of the present invention is a computer program which is written in a computer-readable format so that processing to manage a wireless network is performed on a computer system, comprising:

a management information acquiring step for acquiring management information in the network concerned;

a reception region allocating step for allocating reception regions specific to each station participating in the network concerned according to the management information; and an allocation information transmitting step for transmitting allocation information for reception regions for each station to the station in the network concerned.

A sixth aspect of the present invention is a computer program which is written in a computer-readable format so that control of receiving operation for radio data in a wireless network which operates with a radio frame cycle is exercised on a computer system, comprising:

a reception region allocation information acquiring step for acquiring information related to reception regions allocated to each radio communication device in the wireless network; and a reception processing step for performing reception processing in response to arrival of a reception region allocated to the station concerned.

A seventh aspect of the present invention is a computer program which is written in a computer-readable format so that control of transmitting operation for radio data in a wireless network which operates with a radio frame cycle is exercised on a computer system, comprising:

a reception region allocation information acquiring step for acquiring information related to reception regions allocated to each radio communication device in the wireless network; and a transmission processing step for starting transmission processing in response to arrival of a reception region allocated to a station as the destination of data transmission in the wireless network.

The computer program according to the fifth to seventh aspects of the present invention is defined as a computer program described in a computer-readable format so that predetermined processing is performed on a computer system. In other words, collaborative action is produced on a computer system by installing the computer program according to the fifth to seventh aspects of the present invention on the computer system. Thus, the same action and effect as in the radio communication device or the radio communication method according to the second to fourth aspects of the present invention are produced.

Other and further objects, features, and advantages of the present invention will be apparent from the embodiments of the present invention described below and the more detailed description in connection with the accompanying drawings.

BRIEF DESCRIPTION OF DRAWINGS

FIG. 12 is a drawing schematically illustrating an example of the constitution of a beacon signal used in the wireless network in the second embodiment of the present invention.

FIG. 17 is a drawing illustrating an example of data transmission using UWB.

BEST MODE FOR CARRYING OUT THE INVENTION

Figure 1:
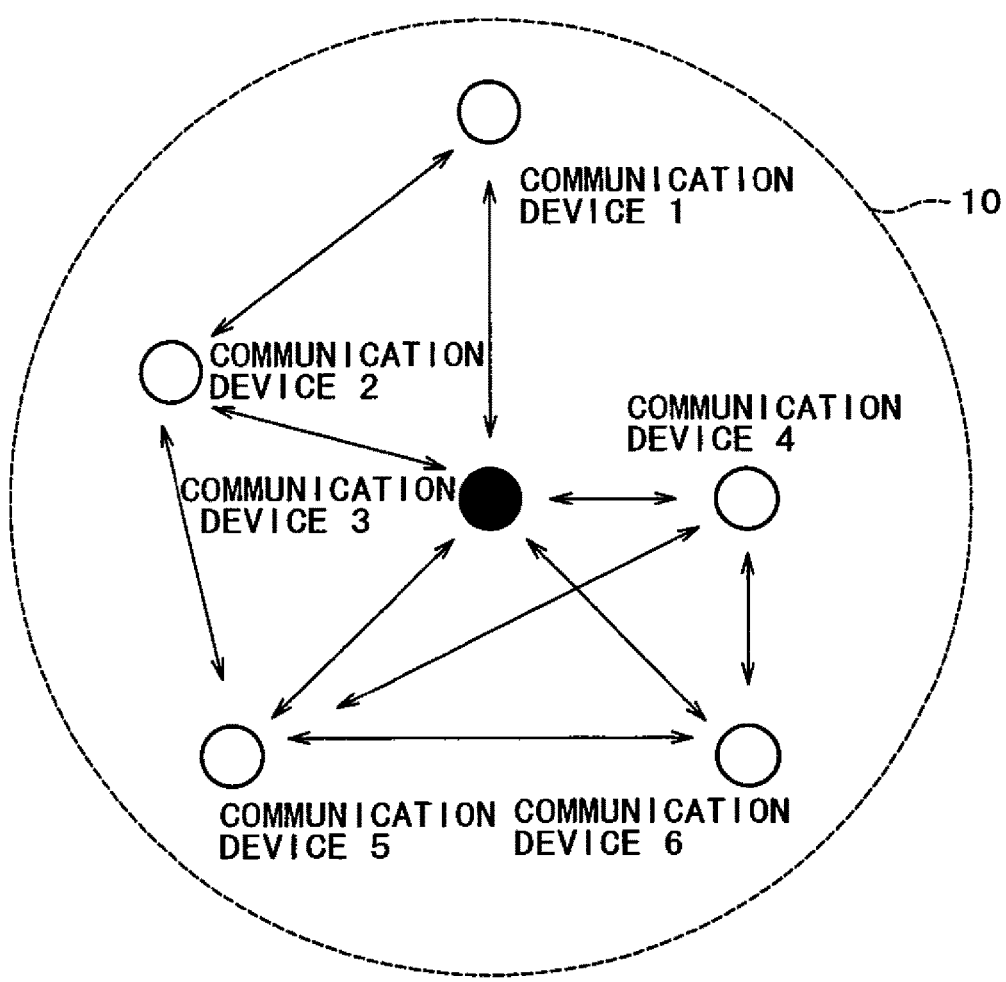
FIG. 1 is a drawing schematically illustrating the constitution of a small-scale wireless network in a first embodiment of the present invention.

Referring to the drawings, the embodiments of the present invention will be described.

First Embodiment

FIG. 1 schematically illustrates the constitution of a small-scale wireless network in the first embodiment of the present invention.

In the illustrated wireless network, one radio communication device 3 operates as the control station. The wireless network is set up within the communication range 10 of the communication device 3 based on, for example, the UWB radio communication method. Within the communication range 10, a plurality of radio communication devices 1, 2, 4, 5, and 6 can participate in the wireless network and can conduct radio data communication under the control of the radio communication device 3.

In FIG. 1, the double-headed arrows indicate that one communication device and another that can directly communicate with each other are in such a state that the communication devices can freely exchange information with each other. More specifically, the communication device 1 can communicate with the communication devices 2 and 3, and the communication device 2 can communicate with the communication devices 1, 3, and 5. The communication device 3 can communicate with any of the communication devices 1, 2, 4, 5, and 6, and the communication device 4 can communicate with the communication devices 3, 5, and 6. The communication device 5 can communicate with the communication devices 2, 3, 4, and 6, and the communication device 6 can communicate with the communication devices 3, 4, and 5.

In the wireless network in this embodiment, the communication device 3 which operates as the control station defines a radio frame with a predetermined cycle. Then, the communication device 3 places in the frames a plurality of access slots for an arbitrary communication device to receive information and transmits this state in beacon signals. Thus, the communication device 3 uniquely exercises access control on all the devices in the network.

Meanwhile, the communication devices other than the control station store access slot information described in beacon signals from the control station and transmit and receive information based on the access slot information. Thus, access control is easily exercised according to instructions from the control station.

Each radio communication device performs receiving operation at access slots allocated to the communication device itself based on the beacon signals. Thus, reception processing is simplified. Further, each communication device need not keep on waiting for reception, and the power consumption of the device can be reduced.

Further, each radio communication device can easily grasp the timing of reception of the other radio communication devices only by receiving beacon signals from the control station. More specifically, each communication device performs timing synchronization for the arrangement of access slots based on beacon signals and thereby synchronizes itself with the timing in the network. Thus, transmission processing can be simplified. When a radio communication device makes data transmission, the device makes information transmission utilizing access slots for the device which is to receive the data. Thus, asynchronous communication excellent in random accessibility can be implemented.

Figure 2:
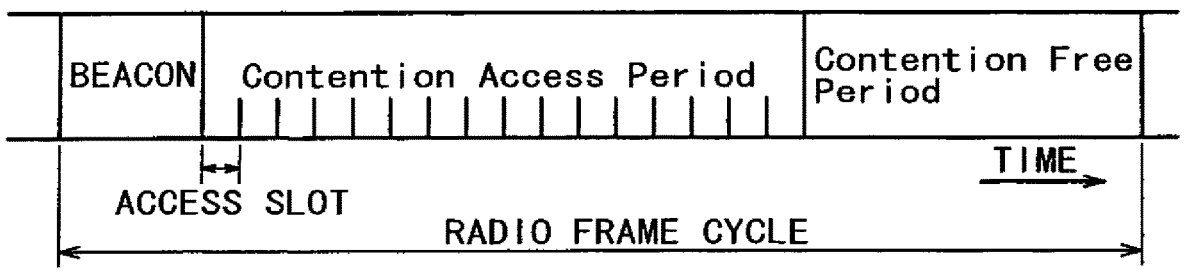
FIG. 2 is a drawing schematically illustrating an example of the constitution of a radio frame cycle used in the wireless network in the first embodiment of the present invention.

FIG. 2 schematically illustrates an example of the constitution of a radio frame cycle used in the wireless network in this embodiment.

The communication device 3 which operates as the control station of the wireless network broadcasts a beacon (beacon signal) at the start of the radio frame with a predetermined radio frame cycle. Thereby, the radio frame cycle is defined.

Subsequently to the beacon, contention access periods (CAP: Control Access Period) and contention free periods (CFP: Control Free Period) are placed.

In the contention access periods, short asynchronous information and commands can be exchanged. In the contention free periods, information transmission by bandwidth reservation or the like is made between arbitrary communication devices in response to a request from an arbitrary communication device.

In this embodiment, a plurality of access slots are placed in contention access periods. Each access slot is allocated as a reception processing period specific to each communication device under the control of the control station.

Figure 3:
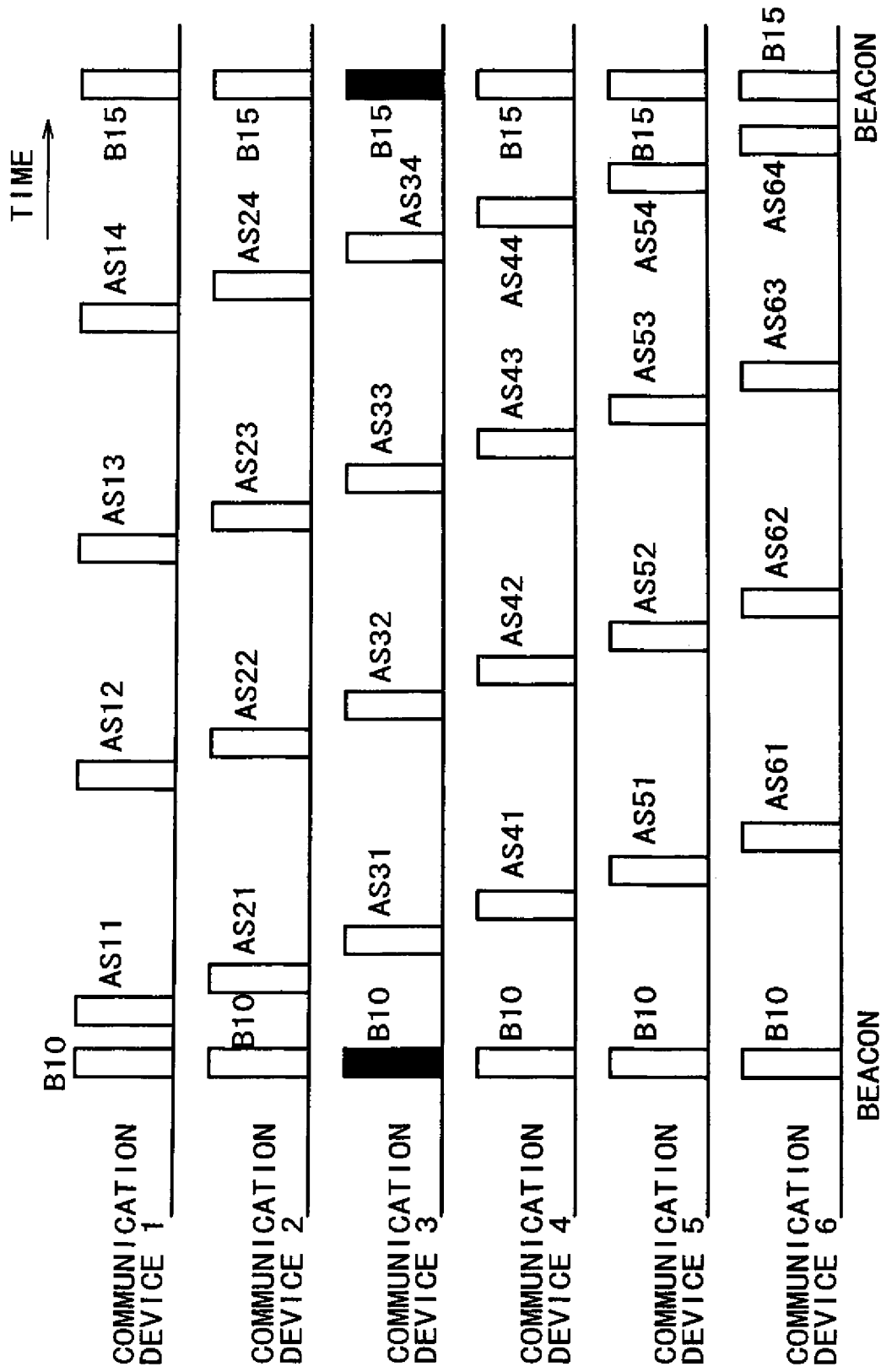
FIG. 3 is a drawing schematically illustrating an example of the constitution of a radio frame wherein access slots specific to the individual radio communication devices 1 to 6 in the wireless network are allocated thereto.

FIG. 3 schematically illustrates an example of the constitution of a radio frame wherein access slots specific to the individual communication devices 1 to 6 in the wireless network are allocated.

For the communication device 1, access slots AS11 to AS14 for the device itself are placed behind the beacon reception position B10 in the radio frame based on information in the beacon signal from the control station. According to the information in the beacon signal from the control station, the positions of these access slots and the next beacon reception position B15 can be judged.

For the communication device 2, access slots AS21 to AS24 for the device itself are placed behind the beacon reception position B10 in the radio frame based on information in the beacon signal from the control station. According to the information in the beacon signal from the control station, the positions of these access slots and the next beacon reception position B15 can be judged.

The communication device 3 sets the position of the beacon signal B10 transmitted by the device 3 itself, specifies access slots AS31 to AS34 for the device 3 itself in the radio frame, and sets the transmission position B15 of the next beacon.

For the communication device 4, access slots AS41 to AS44 for the device itself are placed behind the beacon reception position B10 in the radio frame based on information in the beacon signal from the control station. According to the information in the beacon signal from the control station, the positions of these access slots and the next beacon reception position B15 can be judged.

For the communication device 5, access slots AS51 to AS54 for the device itself are placed behind the beacon reception position B10 in the radio frame based on information in the beacon signal from the control station. According to the information in the beacon signal from the control station, the positions of these access slots and the next beacon reception position B15 can be judged.

For the communication device 6, access slots AS61 to AS64 for the device itself are placed behind the beacon reception position B10 in the radio frame based on information in the beacon signal from the control station. According to the information in the beacon signal from the control station, the positions of these access slots and the next beacon reception position B15 can be judged.

As illustrated in FIG. 3, the access slots in the contention access periods are allocated to each radio communication device that has participated in the wireless network 10 in, for example, a round-robin fashion. Therefore, each radio communication device performs reception processing only at access slots for the device itself and thus can receive data without fail. Further, each radio communication device need not be in wasteful reception wait state. Thus, reception processing is simplified and power consumption is reduced. Further, each radio communication device can learn access slots allocated to the other radio communication devices in the same-wireless network based on beacon information from the control station. Therefore, each radio communication device can transmit data utilizing access slots for the device as the destination of transmission. Thus, transmission processing is simplified.

Figure 4:
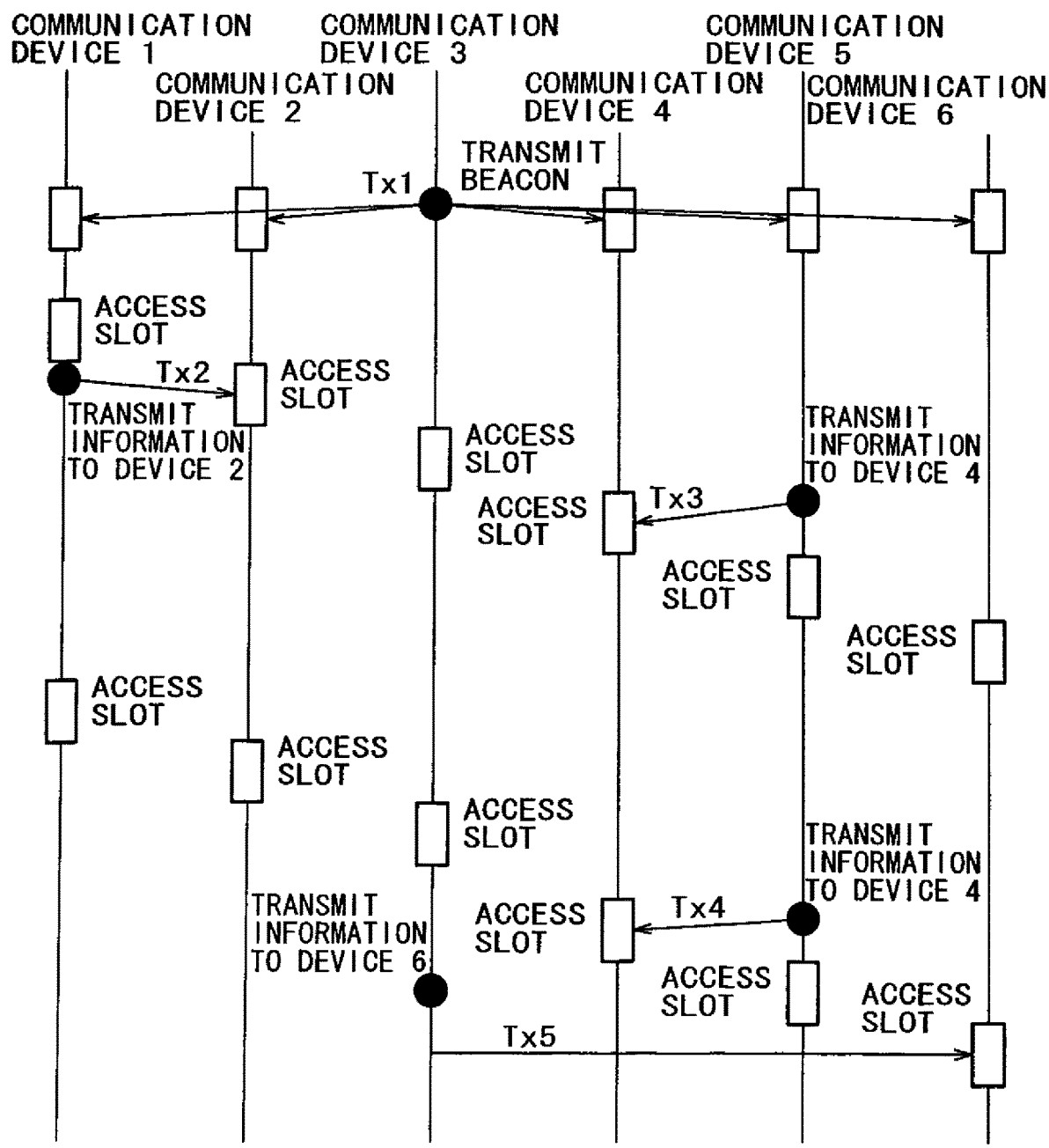
FIG. 4 is a drawing schematically illustrating an example of the sequence in which the individual communication devices 1 to 6 make information transmission using respective access slots.

FIG. 4 schematically illustrates an example of the sequence in which the individual communication devices 1 to 6 make information transmission using respective access slots. However, it is assumed that the access slots illustrated in FIG. 3 are allocated to the communication devices 1 to 6.

First, the communication device 3 which operates as the control station transmits a beacon signal (Tx1) at the start of the frame.

The beacon signal is sent out, for example, by broadcast, and can be received by all the other communication devices existing within the communication range 10. Further, the beacon signal contains access slot allocation information for all the communication devices 1 to 6 (including the control station) within the communication range 10 (described later). Therefore, by receiving the beacon signal, the communication devices can learn access slots allocated to themselves, that is, the timing of reception. Further, the communication devices can learn the timing of data transmission to the other communication devices.

In the example illustrated in FIG. 4, information transmission from the communication device 1 to the communication device 2 (Tx2) is made by the communication device 1 with the timing of reception access slots for the communication device 2.

Information transmission from the communication device 5 to the communication device 4 (Tx3), (Tx4) is made by the communication device 5 with the timing of reception access slots for the communication device 4.

Information transmission from the communication device 3 to the communication device 6 (Tx5) is made by the communication device 3 with the timing of reception access slots for the communication device 6.

It should be fully understood that, in the wireless network in this embodiment, the individual communication devices 1 to 6 make data transmission in accordance with access slots allocated to the communication device which is to receive the data, as mentioned above. Further, the individual communication devices 1 to 6 perform reception processing only at access slots allocated to themselves. Thus, the driving power consumption of the devices can be reduced.

Figures 5, 6:
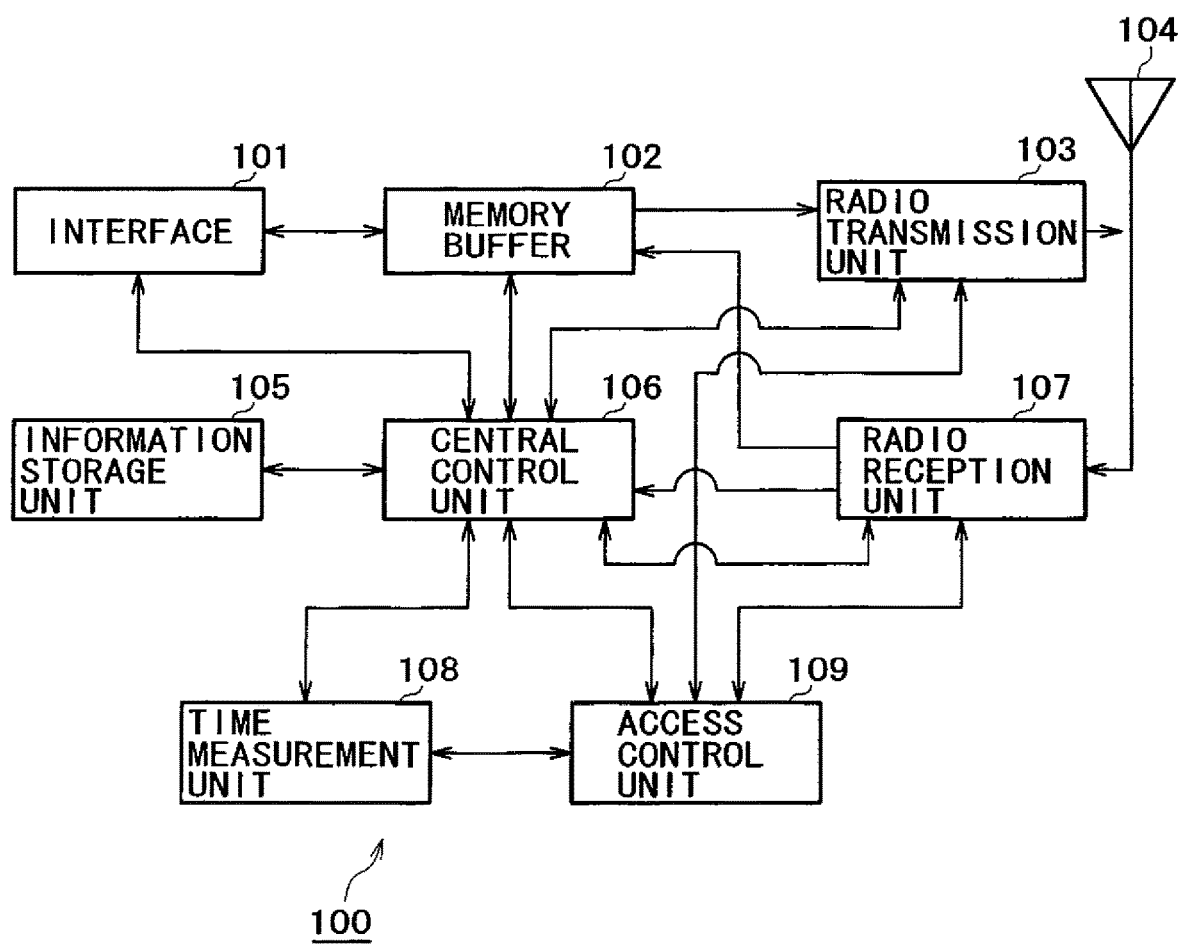
FIG. 5 is a drawing schematically illustrating an example of the constitution of a beacon signal used in the wireless network in the first embodiment of the present invention.
FIG. 6 is a drawing schematically illustrating the constitution of the functional blocks of a radio communication device 100 capable of operating in the wireless network in the first embodiment of the present invention.

FIG. 5 schematically illustrates an example of the constitution of a beacon signal used in the wireless network used in this embodiment.

This beacon signal is composed of a beacon identifier which indicates that the signal concerned is a beacon signal; a device identifier which indicates which communication device operates as the control station; network synchronization parameters comprising time information in the network and the like; maximum transmission power information which is information on the power utilized in the network; slot allocation information in which the situation of slot allocation in contention free regions is described; access slot allocation information in which the situation of access slots allocated to the individual communication devices placed in the wireless network is described; and the like. In the access slot allocation information, the allocation of access slots to the individual radio communication devices 1 to 6, as illustrated in FIG. 3, is described.

The communication device 3 which operates as the control station broadcasts a beacon signal at the start of the radio frame at predetermined time intervals. The radio frame cycle in the wireless network is defined by the time intervals at which the beacon signal is broadcast. Receiving the beacon signal, the radio communication devices 1 to 6 other than the control station can lean access slots allocated to the devices themselves. In other words, they can learn access slots at which they should perform reception processing. Further, the radio communication devices 1 to 6 can learn access, slots allocated to the other radio communication devices. In other words, they can learn access slots which provide the timing of transmission to the other radio communication devices.

In addition to those pieces of information illustrated in the figure, predetermined preamble signals, error detecting code, and the like may be added to the beacon signal as required. Further, any unnecessary parameter in the figure may be deleted as appropriate when the beacon signal is constituted.

FIG. 6 schematically illustrates the constitution of the functional blocks of a radio communication device 100 capable of operating in the wireless network in this embodiment. (Refer to FIG. 1.) It is assumed that the constitution of the radio communication device 100 in the figure is common to the control station which manages the wireless network and the other radio communication devices. (The other radio communication devices means those which are placed in the wireless network under the control of the control station and conduct ordinary information communication.) It is also assumed that the functions of the control station and the other radio communication devices are changeable and depend on differences in processing programs for controlling the operation of the devices.

As illustrated in the figure, the radio communication device 100 comprises an interface 101, a memory buffer 102, a radio transmission unit 103, an antenna 104, an information storage unit 105, a central control unit 106, a radio reception unit 107, a time measurement unit 108, and an access control unit 109. The constitution illustrated here can be replaced with another constitution that performs the same functions, and the radio communication device of the present invention is not limited to this constitution.

The radio communication device 100 can accomplish information communication between it and the other radio communication devices under the centralized control of the central control unit 106. The central control unit 106 is constituted of, for example, a microprocessor. The central control unit 106 executes operating procedure instructions (program code) stored in the information storage unit 105 and thereby controls the operation of the device related to asynchronous radio communication.

In the radio communication device 100 which operates as the control station in the wireless network in this embodiment, the central control unit 106 allocates access slots specific to the individual radio communication devices which have participated in the network in, for example, a round-robin fashion. (Refer to FIG. 3.) Then, the central control unit 106 stores the information of allocation in the information storage unit 105. Further, the central control unit 106 reads the access slot allocation information and other information out of the information storage unit 105 and generates beacon signals. In addition, the central control unit 106 defines the radio frame in its own wireless network, and temporarily stores these pieces of management information for the network in the memory buffer 102. Further, the central control unit 106 sets the parameters thereof (e.g. timing of transmission of beacon signals, access slots allocated to the control station itself) on the access control unit 109.

When the time to transmit has come according to time information supplied from the time measurement unit 108, the access control unit 109 issues an instruction to the radio transmission unit 103. In response thereto, the radio transmission unit 103 transmits the information stored in the memory buffer 102 through the antenna 104 by air. For example, when the start of a radio frame is detected based on time information from the time measurement unit 108, the access control unit 109 instructs the radio transmission unit 103 to transmit (broadcast) a beacon signal.

When the time to receive specified in advance has come according to time information from the time measurement unit 108, the access control unit 109 issues an instruction to receive to the radio reception unit 107. In response thereto, the radio reception unit 107 performs reception processing on signals received through the antenna 104. For example, detecting arrival of an access slot allocated to the communication device itself according to time information from the time measurement unit 108, the access control unit 109 issues an instruction to receive to the radio reception unit 107.

If received information is from any other radio communication device, the radio reception unit 107 of the control station supplies the information to the central control unit 106. The central control unit 106 stores the parameters thereof in the information storage unit 105.

In case of a radio communication device 100 other than the control station, where information received at the radio reception unit 107 is beacon information, the radio reception unit 107 supplies the information to the central control unit 106. The central control unit 106 interprets this beacon information and stores the access slot allocation information contained therein in the information storage unit 105. Further, the central control unit 106 registers the timing of access slots for the communication device itself in the access control unit 109.

In this case, detecting arrival of an access slot for the communication device itself according to time information from the time measurement unit 108, the access control unit 109 issues an instruction to receive to the radio reception unit 107. When transmitted information destined for the radio communication device itself is received at an access slot for the device itself, the information is temporarily stored in the memory buffer 102. The transmitted information is rebuilt on the memory buffer 102 under the operation of the central control unit 106 and supplied to equipment (not shown) connected through the interface 101. If received information is any other information, the information is discarded.

If there is any information supplied from connected equipment (not shown), the interface 101 stores the information to be transmitted in the memory buffer 102. The interface 101 further notifies the central control unit 106 with information on the destination of radio transmission. In response thereto, the central control unit 106 refers to the information of access slots for the radio communication device as the destination of transmission, stored in the information storage unit 105. Then, the central control unit 106 instructs the access control unit 109 to perform transmission processing. When an access slot for the destination of transmission arrives according to time information from the time measurement unit 108, the access control unit 109 issues an instruction to the radio transmission unit 103. In response thereto, the radio transmission unit 103 transmits the transmitted information, stored in the memory buffer 102, through the antenna 104 by air.

Equipment connected through the interface 101 is information processing equipment, such as a personal computer and PDA (Personal Digital Assistant). This type of information processing equipment is not basically provided with a radio communication function. However, when connected with such a communication device as illustrated in FIG. 6, the equipment is capable of transmitting data processed in the equipment itself by air and receiving information transmitted from other devices.

Figure 7:
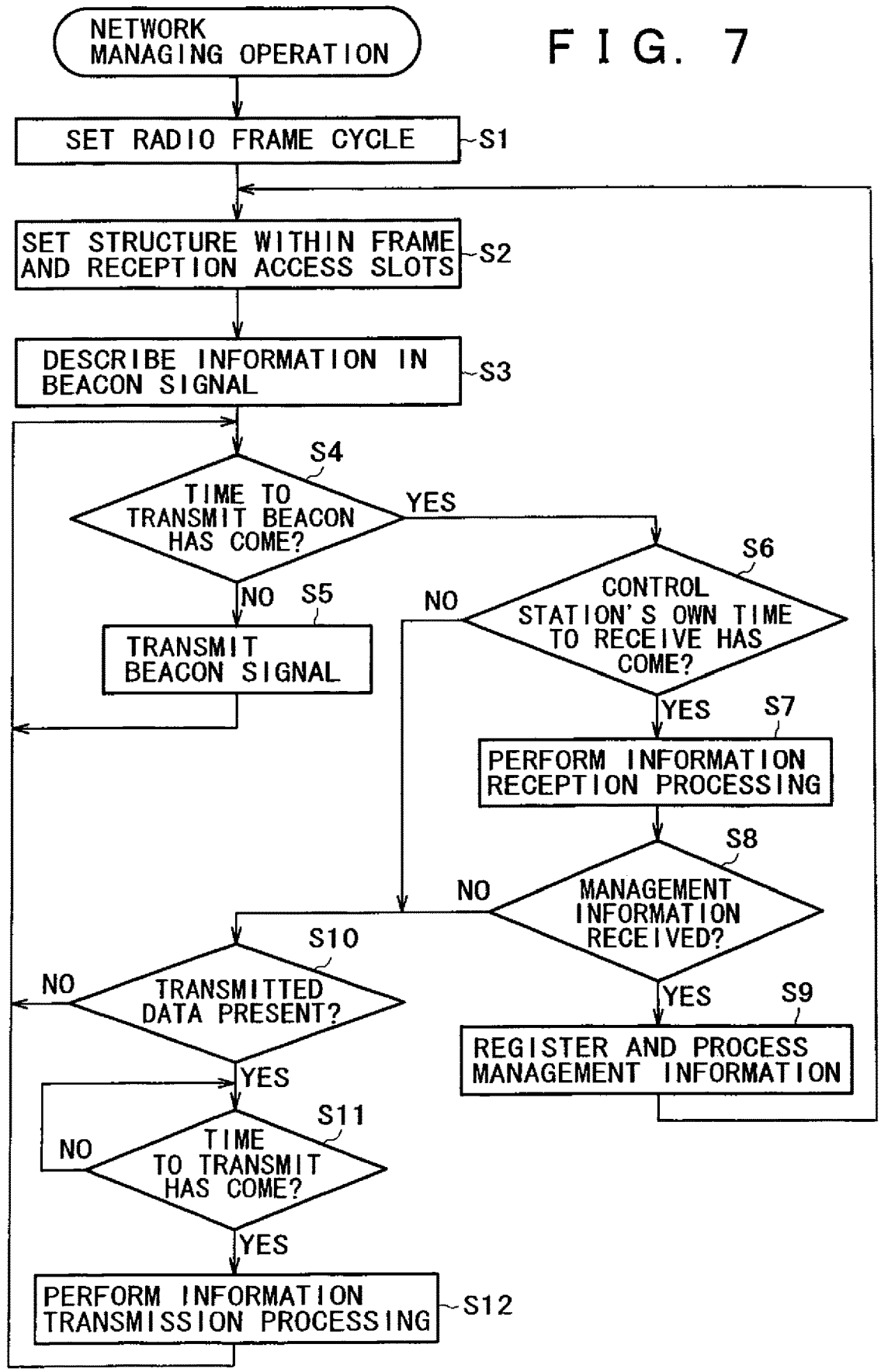
FIG. 7 is a flowchart illustrating the processing operation of a radio communication device 100 which operates as the control station in the wireless network in the first embodiment of the present invention.

FIG. 7 illustrates the processing operation of a radio communication device 100 which operates as the control station in the wireless network in this embodiment, in the form of flowchart. This procedure is actually carried out by the central control unit 106 executing operating procedure instructions (programs) stored in the information storage unit 105.

Referring to this flowchart, the operation of the control station will be described below.

First, the control station sets a radio frame cycle (Step 1). Further, the control station sets contention access periods (CAP) and contention free periods (CFP) in the frame and access slots for the individual radio communication devices (including the control station itself) in the wireless network (Step 2).

Then, the control station generates a beacon signal containing the access slot allocation information and temporarily stores the signal in the memory buffer 102. Further, the control station sets the parameters thereof (e.g. timing of transmission of beacon signals, access slots allocated to the control station itself) on the access control unit 109 (Step 3).

Detecting arrival of the time to transmit the beacon according to time information from the time measurement unit 108 (Step 4), the access control unit 109 issues an instruction to the radio transmission unit 103. In response thereto, the radio transmission unit 103 transmits (broadcasts) the beacon signal stored in the memory buffer 102 through the antenna 104 by air (Step 5).

When the time to transmit the beacon signal has not arrived yet, the unit 109 judges whether the time to receive, that is, an access slot for the control station itself, has come according to time information from the time measurement unit 108 (Step 6).

When a reception slot for the control station itself has come, the access control unit 109 issues an instruction to receive to the radio reception unit 107. In response thereto, the radio reception unit 107 performs reception processing on signals received through the antenna 104 (Step 7). If the received information is from any other radio communication device, the information is supplied to the central control unit 106. The central control unit 106 stores the parameters thereof in the information storage unit 105.

When management information destined for the control station is received (Step 8), the management information is registered and processed (Step 9). The registration of management information described here includes, for example, the following: if a new radio communication device participates in the network, access slots for the device a reset and bandwidth reservation sections (GTS) in contention free periods (CFP) are set. Then, at Step 2, resetting is performed based on parameters changed by the above-mentioned processing.

When the control station's own time to receive has not arrived yet, it is checked whether transmitted data is stored in the memory buffer 102 through the interface 101. This check is also carried out after information reception processing (excluding the registration of management information) is completed. (Step 10)

If there is transmitted data, the central control unit 106 refers to the information storage unit 105 and acquires access slot information of the radio communication device as the destination of transmission. Then, the central control unit 106 instructs the access control unit 109 to perform transmission processing. The access control unit 109 waits until an access slot for the destination of transmission arrives according to time information supplied from the time measurement unit 108 (Step 11). Then, the access control unit 109 issues an instruction to the radio transmission unit 103. In response thereto, the radio transmission unit 103 transmits the transmitted information stored in the memory buffer 102 through the antenna 104 by air (Step 12). Thereafter, the operation proceeds to the Step 4 and the communication device performs a series of processing as the control station again.

Figure 8:
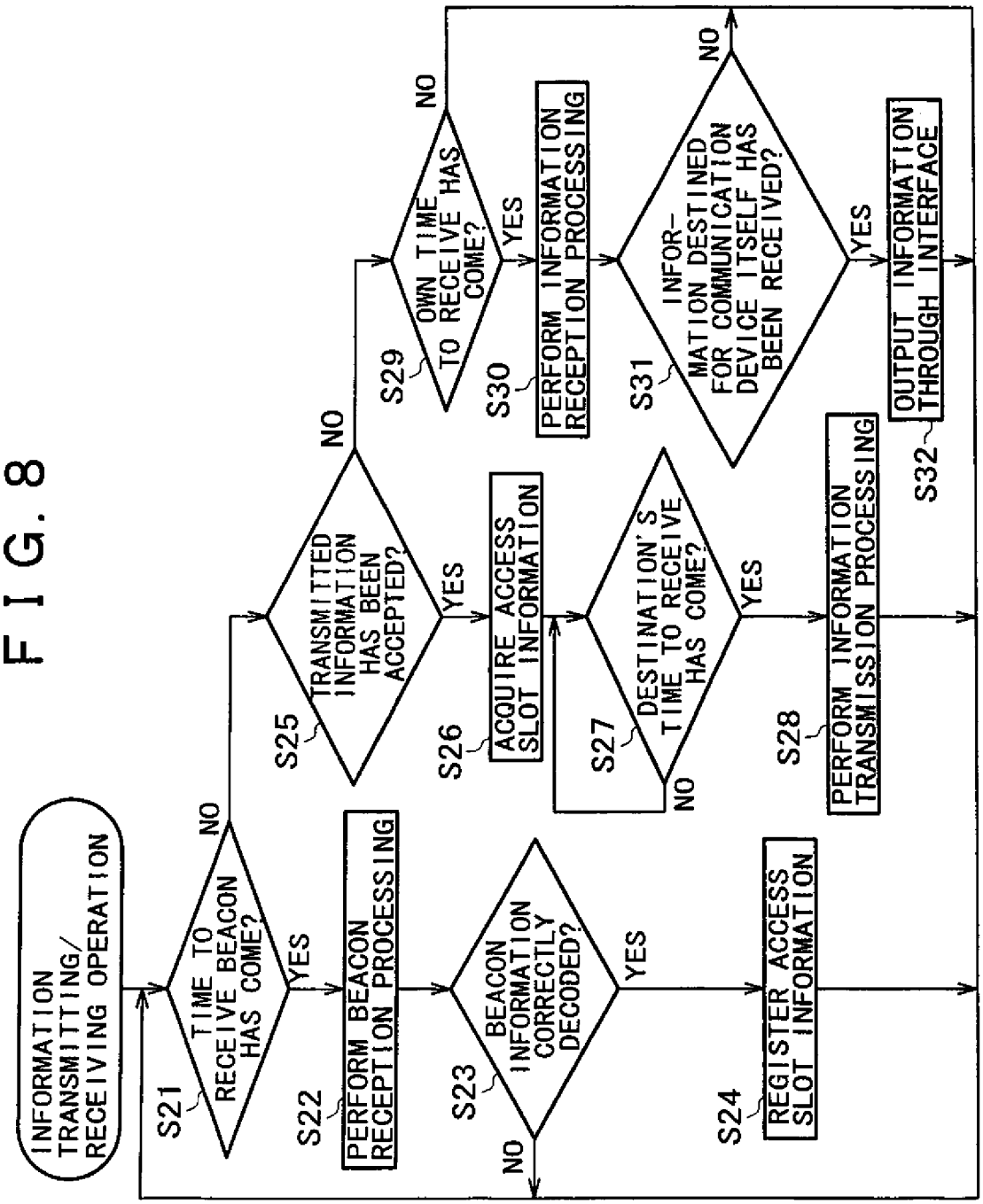
FIG. 8 is a flowchart illustrating the processing operation of a radio communication device 100 which operates in the network set up under the control of the control station.

FIG. 8 illustrates the processing operation of a radio communication device 100 which operates in the network under the control of the control station, in the form of flowchart. (However, it is assumed that the control station performs the processing operation illustrated in FIG. 7.) The procedure is actually carried out by the central control unit 106 executing operating procedure instructions (programs) stored in the information storage unit 105. Referring to this flowchart, the operation of the control station will be described below.

First, the radio communication device 100 judges whether the time to receive a beacon has come (Step 21).

When the time to receive a beacon has come, the radio reception unit 107 performs reception processing on the beacon (Step 22). Then, the central control unit 106 judges whether the beacon information has been correctly decoded (Step 23).

When the beacon signal is correctly decoded, the central control unit 106 interprets the beacon information and stores the access slot allocation information contained therein in the information storage unit 105. Further, the central control unit 106 registers the timing of access slots for the communication device itself in the access control unit 109 (Step 24). Then, the operation goes back to Step 21 and the same processing as mentioned above is repeatedly performed.

If the received beacon signal is not correctly decoded, it turns out that any access slot has not been identified in that radio frame and access slots are not set. In this case, the operation goes back to Step 21, and reception processing is performed with arbitrary timing within the radio frame.

If it is judged at Step 21 that it is not the time to receive a beacon, then it is checked whether transmitted data has been stored in the memory buffer 102 through the interface 101 (Step 25).

If there is transmitted data, the central control unit 106 refers to the information storage unit 105 and acquires access slot information of the radio communication device as the destination of transmission. Then, the central control unit 106 instructs the access control unit 109 to perform transmission processing (Step 26). The access control unit 109 waits until an access slot for the destination of transmission arrives according to time information supplied from the time measurement unit 108 (Step 27). Then, the access control unit 109 issues an instruction to the radio transmission unit 103. In response thereto, the radio transmission unit 103 transmits the transmitted information stored in the memory buffer 102 through the antenna 104 by air (Step 28). Thereafter, the operation goes back to Step 21 and the communication device continues to perform a series of processing.

The access control unit 109 judges whether the time to receive, that is, an access slot for the communication device itself, has come (Step 29). When a reception slot for the communication device itself has come, the access control unit 109 issues an instruction to receive to the radio reception unit 107. In response thereto, the radio reception unit 107 performs reception processing on signals received through the antenna 104 (Step 30). Then, it is judged whether information destined for the communication device itself has been received (Step 31).

If the received information is destined for the communication device itself, the information is outputted through the interface (Step 32). Thereafter, the operation goes back to Step 21 and the communication device continues to perform a series of processing.

The same operation also takes place if the received information is not destined for the communication device itself or when the communication device's own time to receive has not arrived yet. That is, the operation goes back to Step 21 and the communication device continues to perform a series of processing.

In the example of the constitution of the radio frame, illustrated in FIG. 2, a plurality of access slots are placed in a contention access region (CAP). The control station in the wireless network allocates access slots as reception processing periods specific to the individual communication devices in, for example, a round-robin fashion.

Figure 9:
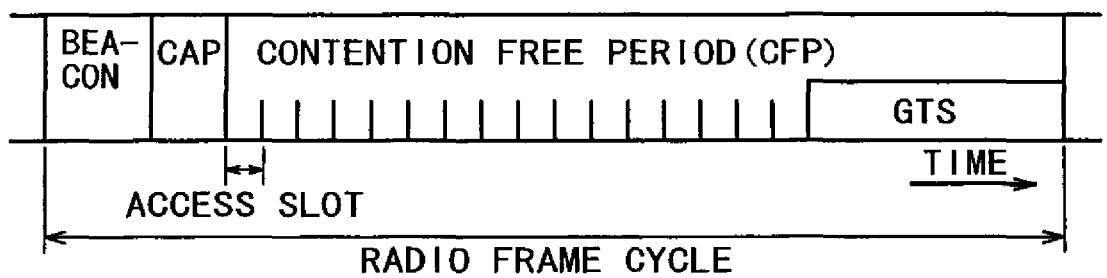
FIG. 9 is a drawing illustrating a modification to the radio frame cycle illustrated in FIG. 2.

An a modification thereto, a plurality of access slots may be placed in contention free periods (CFP), instead of placing access slots in contention access periods (CAP). FIG. 9 schematically illustrates such a modification to the radio frame cycle.

The control station can set bandwidth reservation sections (GTS) in contention free periods (CFP) based on management information received from some other radio communication device in the wireless network.

Second Embodiment

In the above-mentioned first embodiment, reception slots for the individual radio communication devices in a wireless network to receive information destined for themselves are determined in advance. Reception processing is performed only at the slots. Thus, data transmission/reception processing is simplified. Further, the radio communication devices need not keep on waiting for reception, and the power consumption of the devices is reduced.

However, when information transmission is made without specifying any destination as in broadcasting, the same information is must be repeatedly transmitted at reception slots for all the radio communication devices. This is wasteful.

The second embodiment of the present invention is intended to cope with such a problem associated with broadcasting. In addition to access slots provided in contention access periods (or contention free periods) and allocated to each radio communication device, as illustrated in FIG. 3, other access slots are provided. More specifically, access slots for broadcasting are provided so that the access slots are synchronized with one another among the radio communication devices.

In this case, each radio communication device not only performs reception processing on transmitted data destined therefor at access slots for the device itself. The radio communication device also performs receiving operation in a synchronized way at access slots for broadcasting. Thus, information is transmitted without specifying any destination by utilizing these reception slots. Therefore, broadcasting can be implemented with ease.

Figure 10:
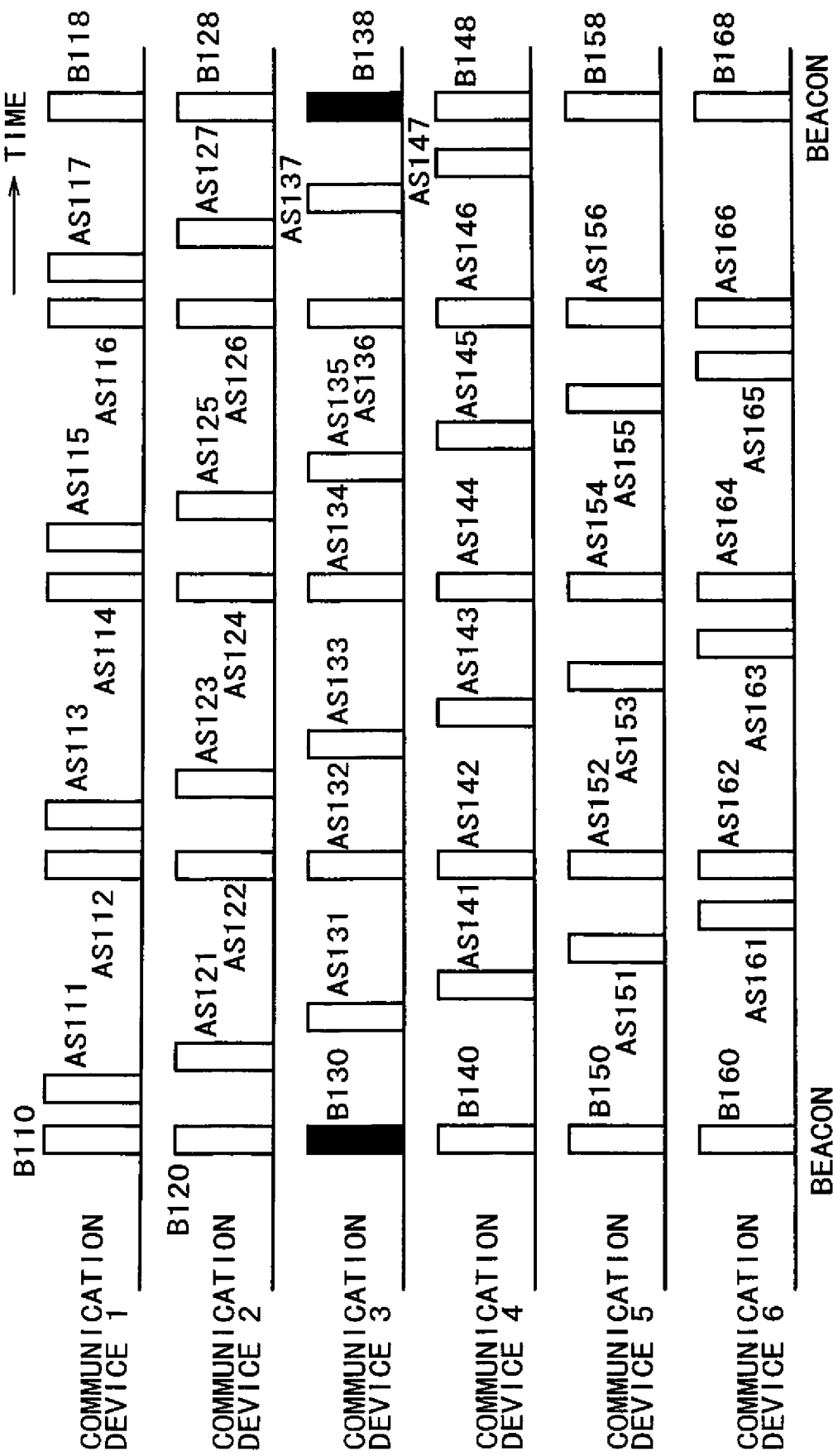
FIG. 10 is a drawing schematically illustrating an example of the constitution of a radio frame wherein access slots specific to the individual communication devices 1 to 6 in the wireless network in a second embodiment of the present invention and access slots for broadcasting are allocated.

FIG. 10 schematically illustrates an example of the constitution of a radio frame wherein access slots specific to the individual communication devices 1 to 6 in a wireless network and access slots for broadcasting are allocated.

For the communication device 1, the beacon reception position B110 and access slots AS111, AS113, AS115, and AS117 for the device itself in the radio frame are placed based on information in the beacon signal from the control station. In addition, access slots AS112, AS114, and AS116 for broadcasting are also placed based on the same. The next beacon reception position B118 can be also judged.

For the communication device 2, the beacon reception position B120 and access slots AS121, AS123, AS125, and AS127 for the device itself in the radio frame are placed based on information in the beacon signal from the control station. In addition, access slots AS122, AS124, and AS126 for broadcasting are also placed based on the same. The next beacon reception position B128 can be also judged.

For the communication device 3, the beacon signal B130 transmitted by the device itself and access slots AS131, AS133, AS135, and AS137 for the device itself in the radio frame are specified. In addition, access slots AS132, AS134, and AS135 for broadcasting are also placed. The transmission position AS138 of the next beacon is set.

For the communication device 4, the beacon reception position B140 and access slots AS141, AS143, AS145, and AS147 for the device itself in the radio frame are placed based on information in the beacon signal from the control station. In addition, access slots AS142, AS144, and AS146 for broadcasting are also placed based on the same. The next beacon reception position B148 can be also judged.

For the communication device 5, the beacon reception position B150 and access slots AS151, AS153, and AS155 for the device itself in the radio frame are placed based on information in the beacon signal from the control station. In addition, access slots AS152, AS154, and AS156 for broadcasting are also placed based on the same. The next beacon reception position B158 can be also judged.

For the communication device 6, the beacon reception position B160 and access slots AS161, AS163, and AS165 for the device itself in the radio frame are placed based on information in the beacon signal from the control station. In addition, access slots AS162, AS164, and AS166 for broadcasting are also placed based on the same. The next beacon reception position B168 can be also judged.

As illustrated in FIG. 10, access slots in contention access periods are allocated to each radio communication device that participates in the wireless network 10 in, for example, a round-robin fashion. Further, access slots for broadcasting are placed in synchronization with one another among the radio communication devices.

Therefore, each radio communication device performs reception processing operation only at access slots specific to the device itself. Or, each radio communication device performs transmission processing operation utilizing access slots allocated to destinations of transmission. Thus, transmission/reception processing is simplified and further the power consumption resulting from reception wait is reduced.

Moreover, each radio communication device performs receiving operation in a synchronized way at access slots for broadcasting. By transmitting information without specifying any destination utilizing these reception slots, broadcasting can be implemented with ease.

Figure 11:
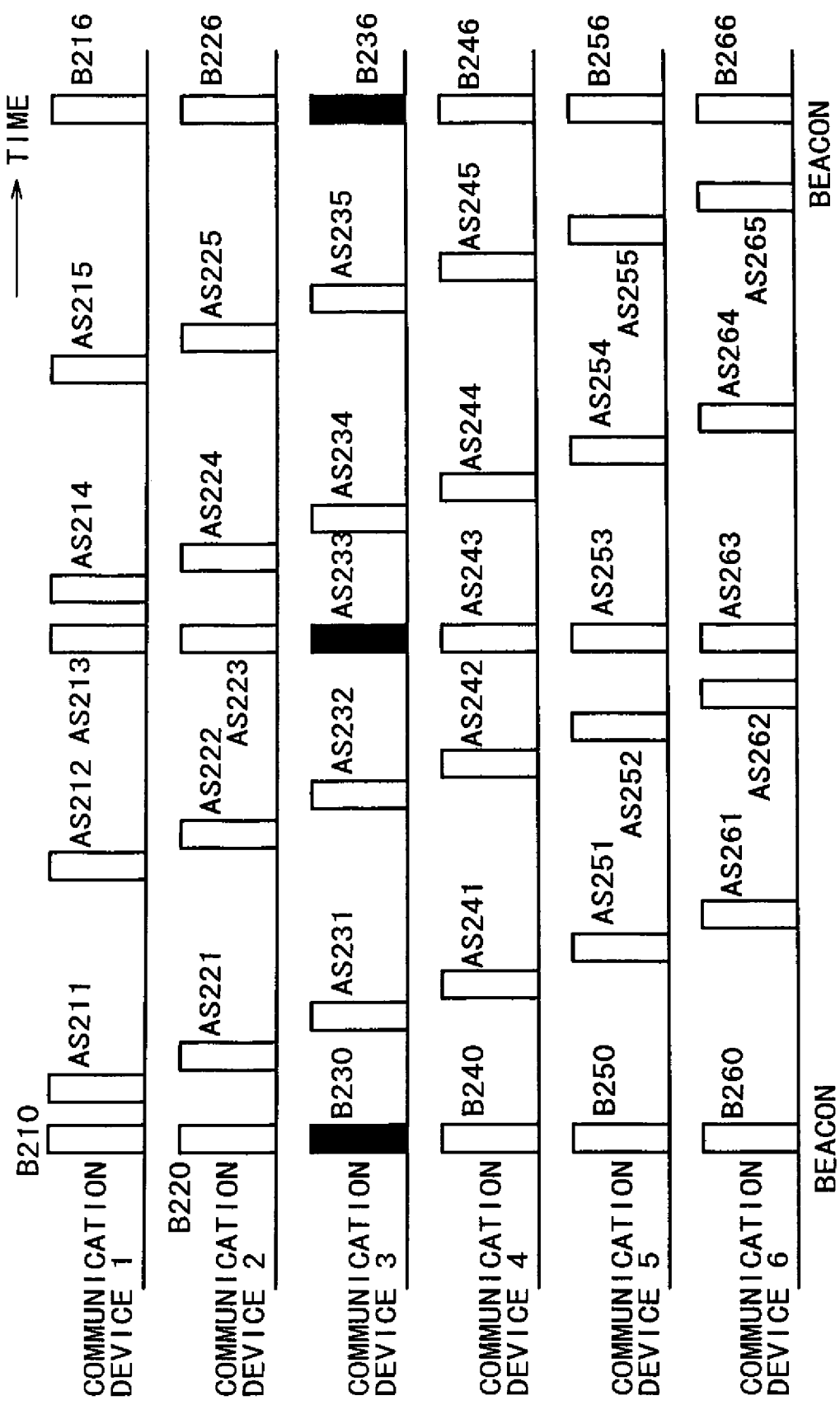
FIG. 11 is a drawing schematically illustrating a modification to the radio frame wherein access slots specific to the individual communication devices 1 to 6 in the wireless network in the second embodiment of the present invention and access slots for broadcasting are allocated.

FIG. 11 schematically illustrates a modification to the radio frame wherein access slots specific to the individual communication devices 1 to 6 in the wireless network and access slots for broadcasting are allocated.

For the communication device 1, the beacon reception position B210 and access slots AS211, AS212, AS214, and AS215 for the device itself in the radio frame are placed based on information in the beacon signal from the control station. In addition, only one access slot AS213 for broadcasting is placed based on the same. The next beacon reception position B216 can be also judged.

For the communication device 2, the beacon reception position B220 and access slots AS221, AS222, AS224, and AS225 for the device itself in the radio frame are placed based on information in the beacon signal from the control station. In addition, only one access slot AS223 for broadcasting is placed based on the same. The next beacon reception position B226 can be also judged.

For the communication device 3, the beacon signal B230 transmitted by the device itself and access slots AS231, AS232, AS234, and AS235 for the device itself in the radio frame are specified. In addition, a access slot AS233 for broadcasting is placed. The transmission position B236 of the next beacon is set.

For the communication device 4, the beacon reception position B240 and access slots AS241, AS242, AS244, and AS245 for the device itself in the radio frame are placed based on information in the beacon signal from the control station. In addition, only one access slot AS243 for broadcasting is placed based on the same. The next beacon reception position B246 can be also judged.

For the communication device 5, the beacon reception position B250 and access slots AS251, AS252, AS254, and AS255 for the device itself in the radio frame are placed based on information in the beacon signal from the control station. In addition, only one access slot AS253 for broadcasting is placed based on the same. The next beacon reception position B256 can be also judged.

For the communication device 6, the beacon reception position B260 and access slots AS261, AS262, AS264, and AS265 for the device itself in the radio frame are placed based on information in the beacon signal from the control station. In addition, only one access slot AS263 for broadcasting is placed based on the same. The next beacon reception position B266 can be also judged.

There is a difference in the arrangement of access slots for broadcasting which are synchronized with one another among the devices between the examples of the constitution of the radio frame illustrated in FIG. 10 and FIG. 11. In FIG. 10, the access slots for broadcasting are placed at a rate of one slot to one round of allocation of specific access slots to the individual radio communication devices 1 to 6 in the wireless network in a round-robin fashion. In FIG. 11, the access slots for broadcasting are placed at a rate of one slot to two rounds of allocation of specific access slots to the individual radio communication device 1 to 6 in the wireless network in a round-robin fashion. Thus, the arrangement of reception regions specific to each radio communication device and common reception regions can be modified as required according to the load of communications traffic or the like in the network. Thereby, communication in a wireless network can be efficiently controlled.

Naturally, the subject matter of the present invention is not limited to FIG. 10 or FIG. 11. With any other constitution of radio frame, the effect of the present invention can be similarly produced; however, specific access slots must be allocated to the individual radio communication devices and access slots for broadcasting must be placed so that they are synchronized with one another among the devices.

FIG. 12 schematically illustrates an example of the constitution of a beacon signal used in the wireless network in this embodiment.

This beacon signal is composed of a beacon identifier which indicates that the signal concerned is a beacon signal; a device identifier which indicates which communication device operates as the control station; network synchronization parameters comprising time information in the network and the like; maximum transmission power information which is information on the power utilized in the network; slot allocation information in which the situation of slot allocation in contention free regions is described; access slot arrangement information; and information on the arrangement of broadcast slots in data frames.

In the access slot arrangement information, the arrangement of access slots in data frames, that is, the allocation of access slots to the individual radio communication devices 1 to 6 is described. (Refer to FIG. 10 or FIG. 11.) In the broadcast slot arrangement information, the arrangement of access slots for broadcasting in data frames is described. (Refer to FIG. 10 or FIG. 11.)

The communication device 3 which operates as the control station broadcasts a beacon signal at the start of the radio frame at predetermined time intervals. The radio frame cycle in the wireless network is defined by the time intervals at which the beacon signal is broadcast. Receiving the beacon signal, the radio communication devices 1 to 6 other than the control station can lean access slots allocated to the devices themselves. In other words, they can learn access slots at which they should perform reception processing. Further, the radio communication devices 1 to 6 can learn access slots allocated to the other radio communication devices. In other words, they can learn access slots which provide the timing of transmission to the other radio communication devices.

In addition to those pieces of information illustrated in the figure, predetermined preamble signals, error detecting code, and the like may be added to the beacon signal as required. Further, any unnecessary parameter in the figure may be deleted as appropriate when the beacon signal is constituted.

The radio communication device 100 capable of operating in the wireless network in this embodiment is provided with substantially the same functional blocks as illustrated in FIG. 6. It is assumed that the constitution of the radio communication device 100 in the figure is common to the control station which manages the wireless network and the other radio communication devices. (The other radio communication devices means those which are placed in the wireless network under the control of the control station and conduct ordinary information communication.) It is also assumed that the functions of the control station and the other radio communication devices are changeable and depend on differences in processing programs for controlling the operation of the devices.

The radio communication device 100 can accomplish information communication between it and the other radio communication devices under the centralized control of the central control unit 106. The central control unit 106 is constituted of, for example, a microprocessor. The central control unit 106 executes operating procedure instructions (program code) stored in the information storage unit 105 and thereby controls the operation of the device related to asynchronous radio communication (the same as mentioned above).

In the radio communication device 100 which operates as the control station in the wireless network in this embodiment, the central control unit 106 allocates unique access slots to each of the individual radio communication devices which have participated in the network in, for example, a round-robin fashion. (Refer to FIG. 3.) Further, the central control unit 106 places access slots for broadcasting in the wireless network so that the slots are synchronized with one another among the radio communication devices. Then, the central control unit 106 stores these pieces of access slot arrangement information and broadcast slot arrangement information in the information storage unit 105.

Further, the central control unit 106 reads the access slot allocation information and other information out of the information storage unit 105 and generates beacon signals. In addition, the central control unit 106 defines the radio frame in the wireless network concerned, and temporarily stores these pieces of management information for the network in the memory buffer 102. Further, the central control unit 106 sets the parameters thereof (e.g. timing of transmission of beacon signals, access slots allocated to the control station itself, broadcast slots) on the access control unit 109.

When the time to transmit has come according to time information supplied from the time measurement unit 108, the access control unit 109 issues an instruction to the radio transmission unit 103. In response thereto, the radio transmission unit 103 transmits the information stored in the memory buffer 102 through the antenna 104 by air. For example, when the start of a radio frame is detected based on time information from the time measurement unit 108, the access control unit 109 instructs the radio transmission unit 103 to transmit (broadcast) a beacon signal.

When the time to receive specified in advance has come according to time information from the time measurement unit 108, the access control unit 109 issues an instruction to receive to the radio reception unit 107. In response thereto, the radio reception unit 107 performs reception processing on signals received through the antenna 104. For example, detecting arrival of an access slot allocated to the communication device itself according to time information from the time measurement unit 108, the access control unit 109 issues an instruction to receive to the radio reception unit 107.

If received information is from any other radio communication device, the radio reception unit 107 of the control station supplies the information to the central control unit 106. The central control unit 106 stores the parameters thereof in the information storage unit 105.

In case of a radio communication device 100 other than the control station, where information received at the radio reception unit 107 is beacon information, the radio reception unit 107 supplies the information to the central control unit 106. The central control unit 106 interprets this beacon information and stores the access slot arrangement information and the broadcast slot arrangement information contained therein in the information storage unit 105. Further, the central control unit 106 registers the timing of access slots specific to the communication device itself and the broadcast slots in the access control unit 109.

In this case, detecting arrival of an access slot for the communication device itself or a broadcast slot for the wireless network according to time information from the time measurement unit 108, the access control unit 109 issues an instruction to receive to the radio reception unit 107. When transmitted information destined for the radio communication device itself is received at an access slot for the device itself, the information is temporarily stored in the memory buffer 102.

The transmitted information is rebuilt on the memory buffer 102 under the operation of the central control unit 106 and supplied to equipment (not shown) connected through the interface 101. If received information is any other information, the information is discarded.

The same operation also takes place where information received at a broadcast slot is broadcast information or where information transmission is destined for the radio communication device 100 itself. That is, the information is stored in the memory buffer 102, and the information is rebuilt on the memory buffer 102 and supplied to equipment (not shown) connected through the interface 101. If received information is any other information, the information is discarded.

If there is any information supplied from connected equipment (not shown), the interface 101 stores the information to be transmitted in the memory buffer 102. The interface 101 further notifies the central control unit 106 with information on the destination of radio transmission. In response thereto, the central control unit 106 refers to the information of access slots for the radio communication device as the destination of transmission, stored in the information storage unit 105. Then, the central control unit 106 instructs the access control unit 109 to perform transmission processing. When an access slot for the destination of transmission arrives according to time information supplied from the time measurement unit 108, the access control unit 109 issues an instruction to the radio transmission unit 103. In response thereto, the radio transmission unit 103 transmits the transmitted information, stored in the memory buffer 102, through the antenna 104 by air.

Equipment connected through the interface 101 is information processing equipment, such as a personal computer and PDA. This type of information processing equipment is not basically provided with a radio communication function. However, when connected with such a communication device as illustrated in FIG. 6, the equipment is capable of transmitting data processed in the equipment itself by air and receiving information transmitted from other devices.

Figure 13:
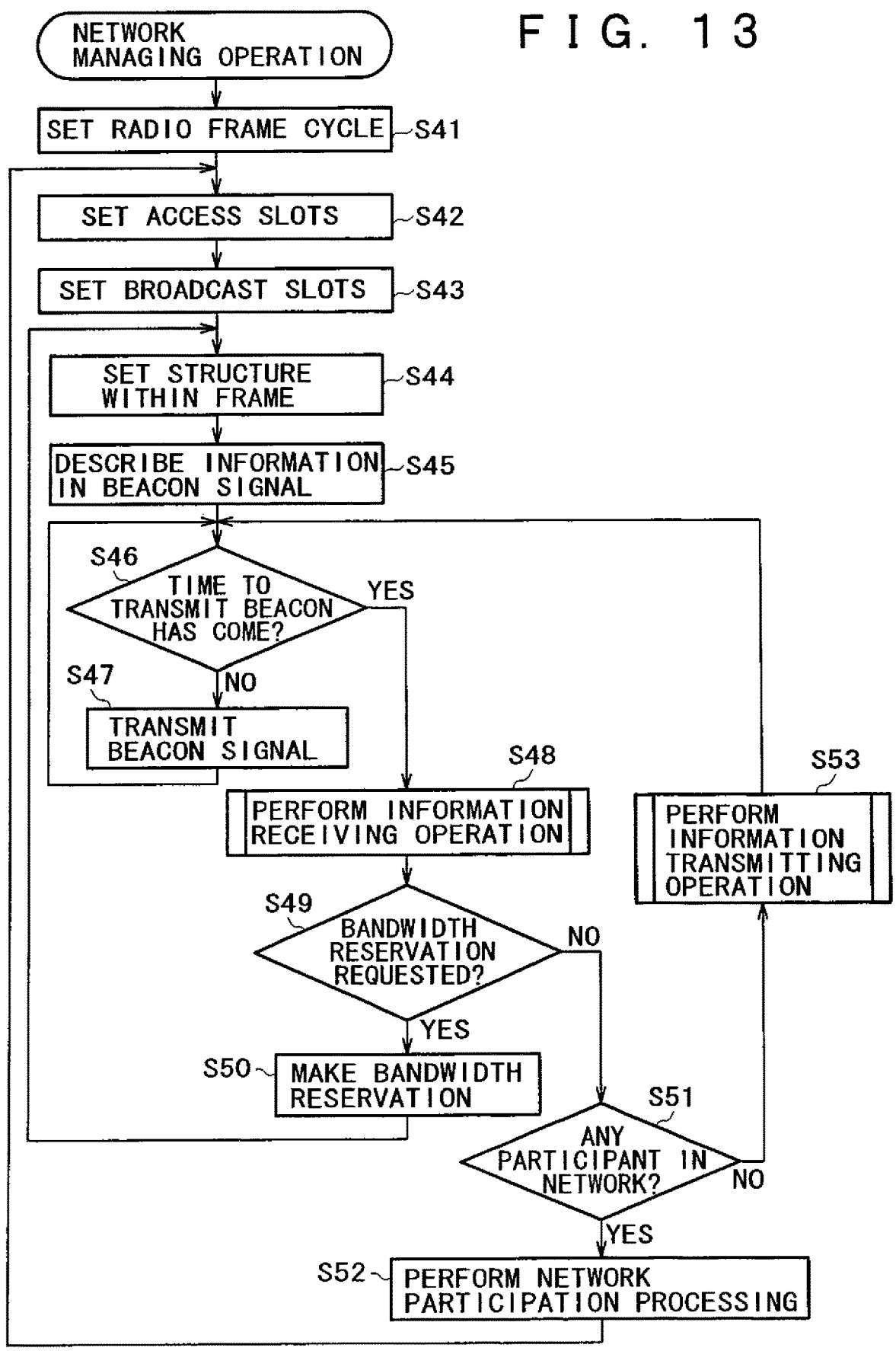
FIG. 13 is a flowchart illustrating the processing operation of a radio communication device 100 which operates as the control station in the wireless network in the second embodiment of the present invention.

FIG. 13 illustrates the processing operation of a radio communication device 100 which operates as the control station in the wireless network in this embodiment, in the form of flowchart. This procedure is actually carried out by the central control unit 106 executing operating procedure instructions (programs) stored in the information storage unit 105. Referring to this flowchart, the operation of the control station will be described below.

First, the control station sets a radio frame cycle (Step 41) and the contention access period (CAP) and the contention free periods (CFP) in the frame. Further, the control station sets access slots for the individual radio communication devices (including the control station itself) in the wireless network (Step 42).

Moreover, the control station sets broadcast slots which are slots for broadcasting (Step 43). At this time, the control station may arbitrarily set the frequency of placement of the slots as required. For example, the arrangement of the reception regions for the individual communication devices and common reception regions may be modified as appropriate depending on the load of communications traffic in the network.

Then, the structure within the frame is set based on the situation of communication bandwidth reservation for communication with bands ensured and the like (Step 44). A series of these pieces of information is described as a beacon signal (Step 45).

Here, it is judged whether the time to transmit the beacon has come (Step 46). The operation proceeds to the next step, Step 47, only when the time to transmit the beacon signal has come, and transmission processing on the beacon signal is performed. After the completion of transmission of the beacon signal, the operation goes back to Step 46.

If it is judged at Step 46 that it is not the time to transmit the beacon signal, the operation proceeds to Step 48, as illustrated by the branch of "No," and the routine of information reception processing is executed.

If there is a bandwidth reservation request associated with information received at Step 48 (Step 49), bandwidth reservation is made (Step 50). Then, the operation goes back to Step 44, and the reservation information is described and set as the structure within the frame.

If there is not a bandwidth reservation request associated with information received at Step 48, it is further judged whether any communication device participates in the network (Step 51). Where there is a communication device which participates in the network, the processing to make the communication device participate in the network is performed (Step 52). Then, the operation goes back to Step 42, and access slots for that communication device are additionally set.

If information reception does not occur at Step 48, the operation proceeds to the routine of information transmission processing (Step 53). Here, if it is required to conduct communication from the control station itself to any other communication device, transmission processing is performed as appropriate. After the completion of transmission processing, the operation goes back to Step 46, and beacon transmission processing is periodically and repeatedly performed.

Figure 14:
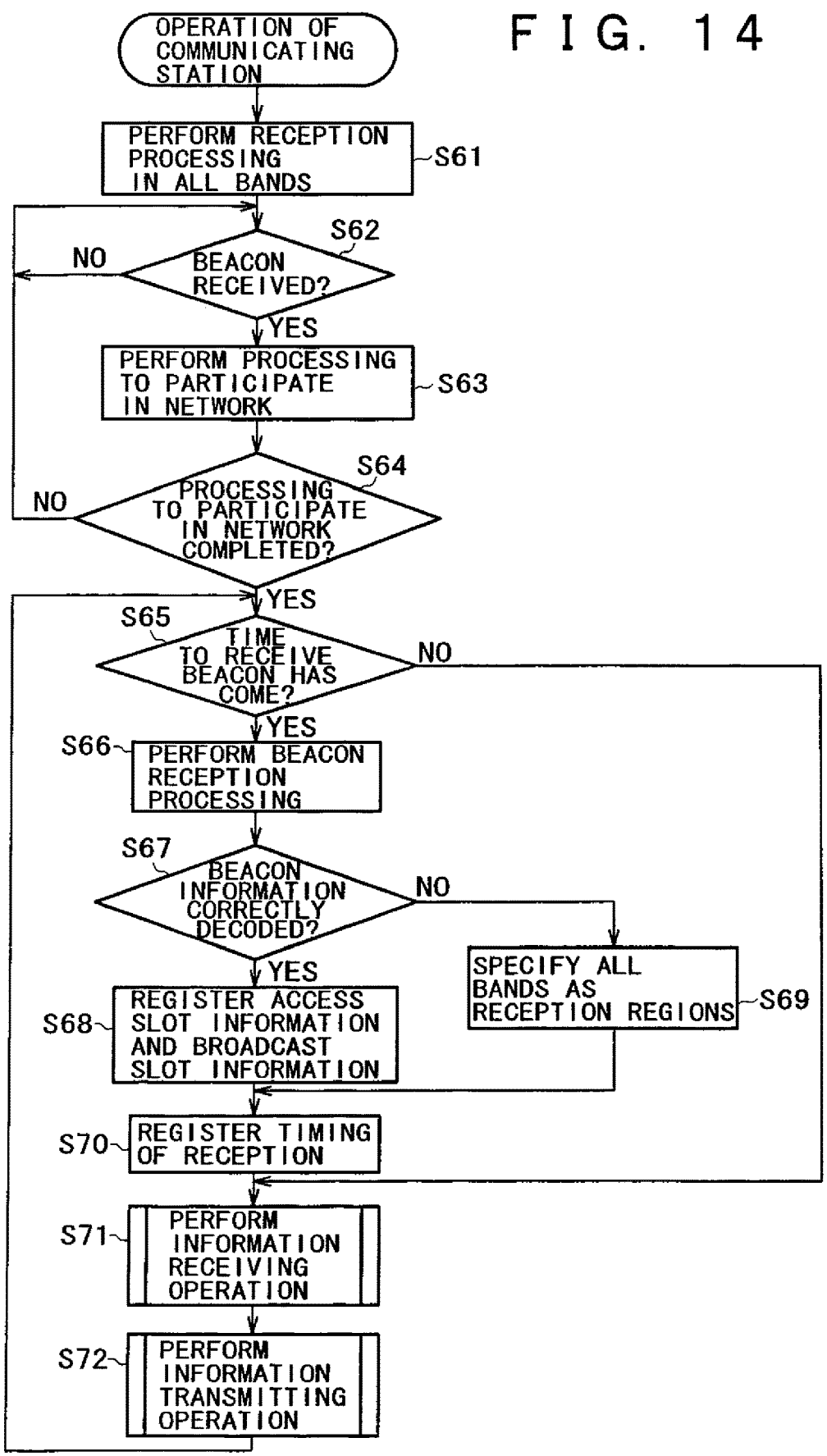
FIG. 14 is a flowchart of the operation of a radio communication device 100 which is not so set as to operate as the control station but operates as a communicating station.

FIG. 14 illustrates the operation of a radio communication device 100 which is not so set as to operate as the control station but operates as a communicating station, in the form of flowchart. This procedure is actually carried out by the central control unit 106 executing operating procedure instructions (programs) stored in the information storage unit 105. Referring to this flowchart, the operation of the control station will be described below.

First, the communicating station performs receiving operation in all the bands for a predetermined time (Step 61). The communicating station judges whether any other radio communication device that operates as the control station exists in the same space, from presence/absence of a received beacon signal (Step 62).

Where a beacon signal is received, the communicating station tries to participate in the wireless network under the control of that control station as required (Step 63).

When the processing to participate in the wireless network is completed (Step 64), the operation proceeds to the next step, Step 65. If the processing to participate in the wireless network is not completed, the operation goes back to Step 62, and the communicating station waits until the next beacon signal is received.

In the wireless network in which the communicating station participated, the station can detect the timing of reception of the next beacon signal by analyzing the received beacon signal. When the time to receive the beacon signal has come (Step 65), the communicating station performs reception processing on the beacon signal (Step 66).

When the beacon signal is correctly decoded (Step 67), the access slot arrangement information and the broadcast slot arrangement information written therein are taken out (Step 68). Then, these pieces of information are respectively registered in the information storage unit 105 as the communicating station's timing of reception (Step 70).

If the beacon information is not correctly decoded (Step 67), all the bands are taken as reception regions for that frame cycle and reception is performed as required for the time being (Step 69).

After the above-mentioned processing or on other occasions than the time to receive a beacon signal, information reception processing is performed (Step 71). Then, information received at reception slots or broadcast reception slots is processed.

Further, information transmission processing is performed (Step 72), and, if there is information to be transmitted, transmission processing on that information is performed.

After a series of these steps of processing, the operation goes back to Step 65 and the same processing as mentioned above is repeatedly performed.

Figure 15:
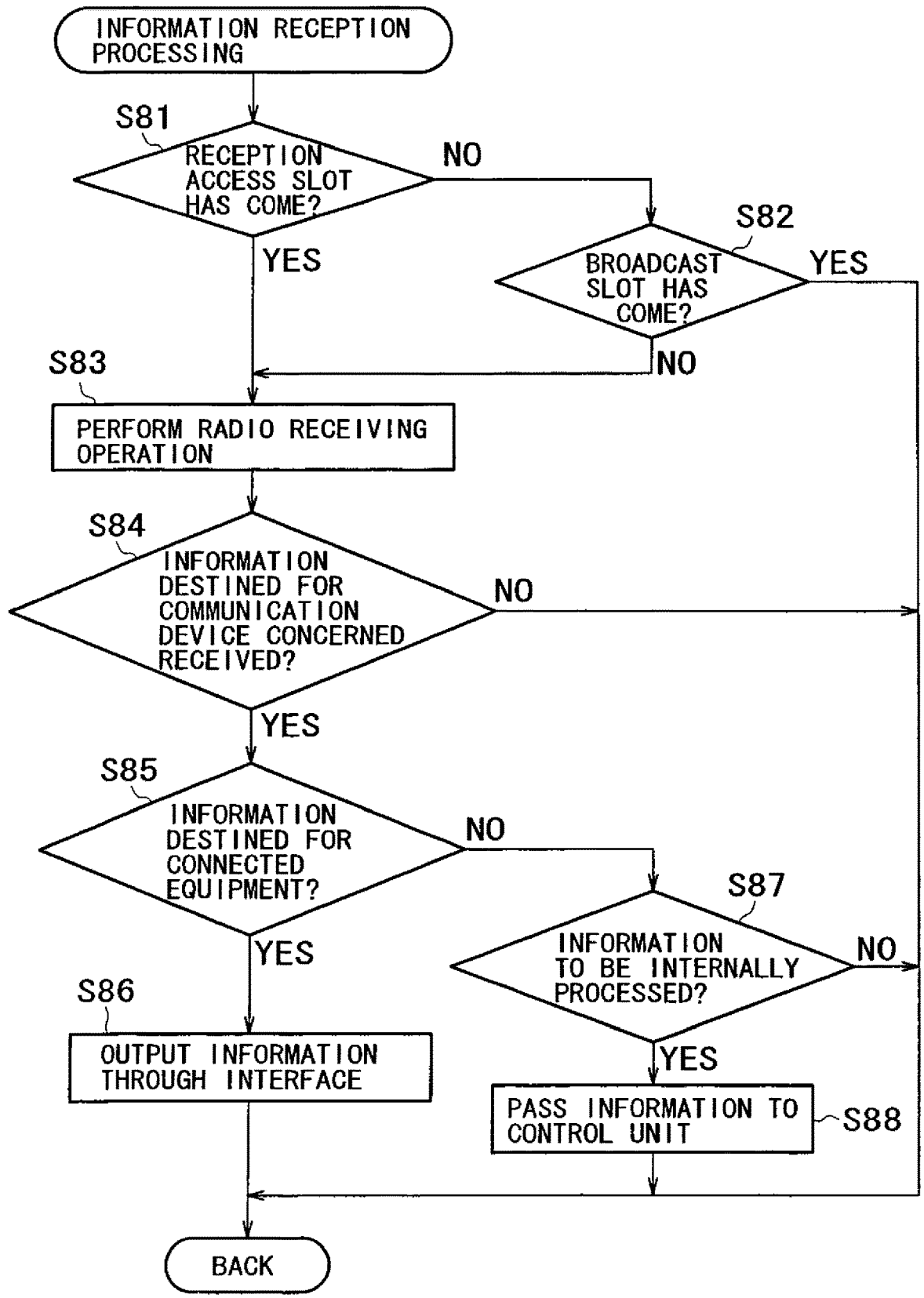
FIG. 15 is a flowchart illustrating the processing operation for a radio communication device 100, placed in the wireless network in the second embodiment of the present invention, to receive information.

FIG. 15 illustrates the processing operation for a radio communication device 100, placed in the wireless network in this embodiment of the present invention, to receive information, in the form of flowchart. This procedure is actually carried out by the central control unit 106 executing operating procedure instructions (programs) stored in the information storage unit 105. Referring to this flowchart, the operation of the control station will be described below.

First, the radio communication device judges whether a reception access slot for the device itself has come (Step 81).

When a reception access slot has come, the operation proceeds to Step 83 and radio reception processing is performed. If a reception access slot has not come yet, it is further judged whether a broadcast slot has come (Step 82).

If neither a reception access slot nor a broadcast slot has come, the process exits at the branch of "No" at Step 82 and the entire processing routine is terminated.

At Step 83, the radio reception unit 107 is actuated, and at Step 84, the radio communication device tries to receive information destined for the device itself. When the information is successfully received, it is further judged whether the information is destined for equipment connected with this radio communication device 100 through the interface 101 (Step 85).

If the information is destined for the equipment, the received information is outputted through the interface 101 and the entire processing routine is terminated (Step 86). If not, it is further judged whether the information is information for internal processing destined for the radio communication device 100 itself (Step 87). If the information is information to be processed within the radio communication device 100, such as network management information, the received information is passed to the central control unit 106 (Step 88) and the entire processing routine is terminated.

If the received information is not destined for the equipment connected through the interface 101 or the radio communication device 100, the process exist at the branch of "No" at S87 and the entire processing routine is terminated.

Figure 16:
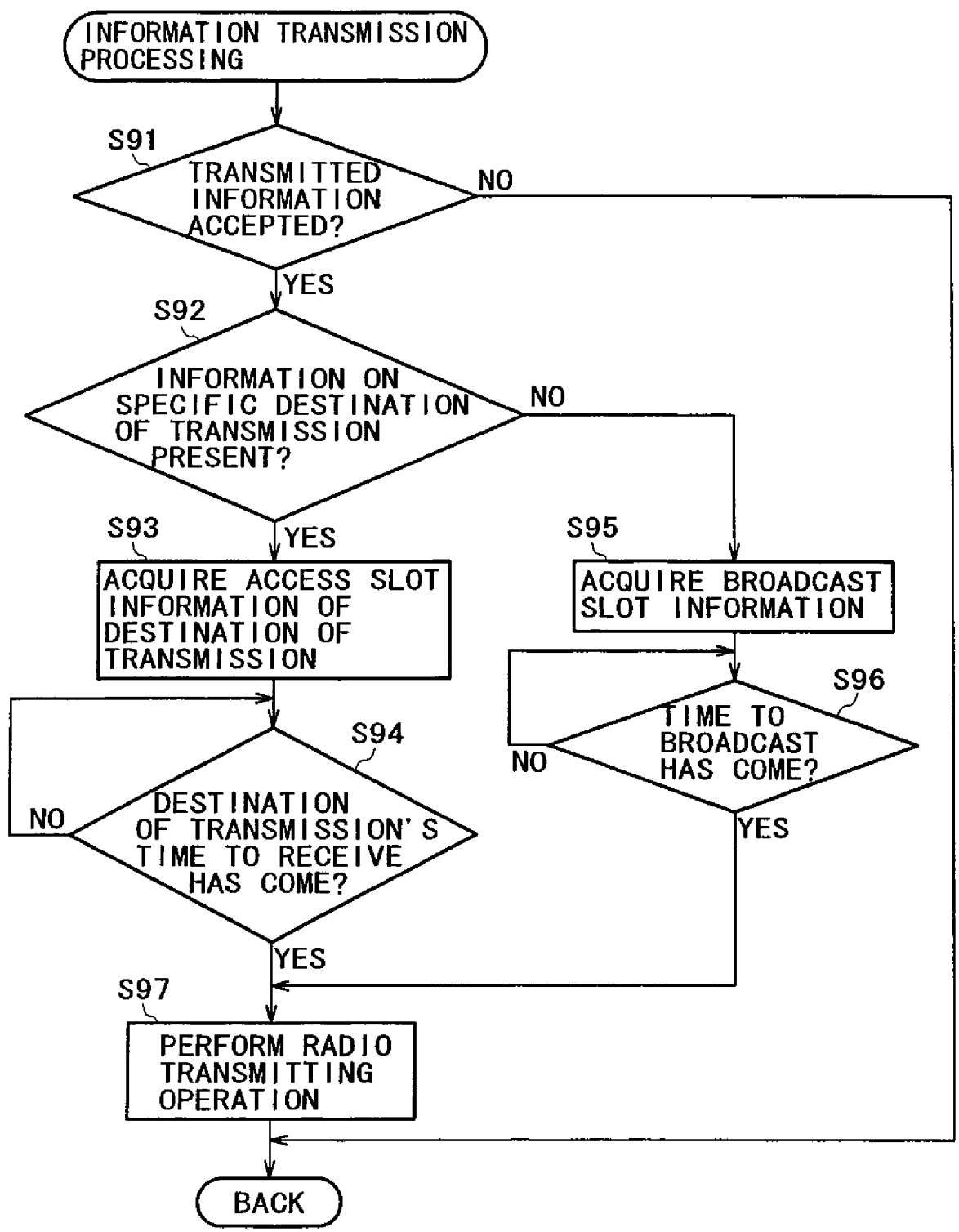
FIG. 16 is a flowchart illustrating the processing operation for a radio communication device 100, placed in the wireless network in the second embodiment of the present invention, to transmit information.

FIG. 16 illustrates the processing operation for a radio communication device 100, placed in the wireless network in this embodiment, to transmit information, in the form of flowchart. This procedure is actually carried out by the central control unit 106 executing operating procedure instructions (programs) stored in the information storage unit 105. Referring to this flowchart, the operation of the control station will be described below.

First, it is judged whether information transmitted from external equipment (not shown) has been accepted in the memory buffer 102 through the interface 101 (Step 91).

If transmitted information has not been accepted, the entire processing routine is terminated. If transmitted information has been accepted, it is judged from the address information thereof whether a specific station which is to receive a transmission is specified (Step 92).

If a specific station which is to receive a transmission is specified, the central control unit 106 refers to the information storage unit 105 and acquires access slot information of the radio communication device as the destination of transmission (Step 93). Then, the central control unit 106 informs the access control unit 109 with the information as the timing of transmission.

The access control unit 109 waits until an access slot for the destination of transmission arrives according to time information supplied from the time measurement unit 108 (Step 94). Then, the access control unit 109 issues an instruction to the radio transmission unit 103. In response thereto, the radio transmission unit 103 transmits the transmitted information, stored in the memory buffer 102, through the antenna 104 by air (Step 97).

If any station that is to receive a transmission has not been set, the central control unit 106 refers to the information storage unit 105 and acquires the information on a broadcast slot in the wireless network concerned (Step 95). Then, the central control unit 106 informs the access control unit 109 with the information as the timing of transmission.

The access control unit 109 waits until a broadcast slot arrives according to time information supplied from the time measurement unit 108 (Step 96). Then, the access control unit 109 issues an instruction to the radio transmission unit 103. In response thereto, the radio transmission unit 103 transmits the transmitted information, stored in the memory buffer 102, through the antenna 104 by air (Step 97). The radio communication device 100 concerned does not perform reception processing at a broadcast slot set as the time to transmit.

In this specification, the specific embodiments of the present invention have been described. The description takes as an example a case where hierarchic topology (e.g. "control station" and "communicating station" controlled by the control station) is constructed like the MAC layer defined by IEEE802.15.3. However, the present invention can be applied to a wireless ad hoc network wherein all the radio communication terminals constituting the network transmit management information (e.g. beacon signal). In this case, the effect of the present invention can be similarly produced. For example, it is said that ad hoc communication is suitable for setting up a small-scale personal area network (PAN). In ad hoc communication, a specific base station or control station is not established but individual radio communication devices freely form networks within ranges where the devices can communicate. The operation of the MAC layer in the wireless ad hoc network is described in, for example, the specifications of JP-B No. 26457/2003, JP-B No. 2.6461/2003, JP-B No. 26462/2003 which have been already assigned to the inventor of the present invention.

Up to this point, the present invention has been described in details referring to the specific embodiments. However, it is obvious that persons skilled in the art can modify or substitute the embodiments of the present invention to the extent that the substance of the present invention is not deviated from. That is, the present invention is disclosed in the form of exemplification, and the contents of the present specification should not be interpreted in a definite fashion. To evaluate the subject matter of the present invention, the section of the scope of claims should be taken into account.

INDUSTRIAL APPLICABILITY

According to the present invention, excellent radio communication system, device and method for radio communication, and computer program wherein asynchronous communication can be conducted with less delay in a wireless network which operates with a predetermined transmission frame cycle are provided.

Further, according to the present invention, excellent radio communication system, device and method for radio communication, and computer program wherein reception processing and management of information therefor are simplified in a wireless network which operates with a predetermined transmission frame cycle are provided.

In the wireless network of the present invention, for example, a radio communication device which manages the network defines a frame with a predetermined cycle. The radio communication device then places a plurality of access slots for an arbitrary communication device to receive information in the frame. Thus, random-accessible wireless transmission frame can be setup and a frame structure suitable for asynchronous communication can be created.

A radio communication device, such as a control station, which manages the network allocates unique access slots to the individual radio communication devices in the network. The radio communication device then transmits the state of allocation in beacon signals. Thus, at every device in the network, access control can be uniquely exercised.

Further, each radio communication device in the wireless network stores access slot information described in beacon signals, and transmits and receives information based on the access slot information. Thus, access control according to instructions from the control station can be exercised with ease.

Each radio communication device performs receiving operation at access slots allocated to the device itself based on beacon signals. Thus, reception processing can be simplified. Further, each radio communication device need not keep on waiting for reception, and the power consumption thereof can be reduced.

Each radio communication device can easily grasp the timing of reception of other radio communication devices only by receiving beacon signals. More specifically, each communication device performs timing synchronization for the arrangement of access slots based on beacon signals and thereby synchronizes itself with the timing in the network. Thus, reception processing can be simplified. When a radio communication device makes data transmission, the device makes information transmission at access slots for the device which is to receive the information. Thus, asynchronous communication excellent in random accessibility can be implemented.

Even if any radio communication device fails to receive a beacon signal, the device can infer the arrangement of access slots for the device itself. This is done by receiving all the access slots in a frame and receiving communication from other radio equipment.

When a radio communication device participates in a wireless network, a radio communication device, such as a control station, which manages the network, allocates access slots to each communication device constituting the network in a unified way. Thus, transmission bands can be efficiently allocated.

Access slots at which the control station receives a transmission are provided. Thus, if a radio communication device participates in the wireless network, the access slots can be used to perform operation for participation. As a result, the transmission line can be utilized with efficiency.

The portions other than access slots can be arranged as allocated slots. Thus, bandwidth reservation transmission suitable for stream transmission utilizing contention free regions can be made with ease.

In the radio communication system of the present invention, reception regions specific to each radio communication device and reception regions common to all the radio communication devices in the network are provided. Thus, a system wherein unicast and broadcast can be efficiently performed in a network is obtained.

Further, the arrangement of reception regions specific to each communication device and common reception regions can be modified as required according to the load of communications traffic in the network. Thus, a system wherein communication in a wireless network can be efficiently controlled is obtained.

Further, a radio communication device which manages the network is provided with a function of providing reception regions for individual radio communication devices and common reception regions as appropriate. Thus, a communication device which controls communication in a network is obtained.

When transmitting information destined for a specific communication device, each radio communication device in the wireless network uses reception regions for the device as the destination of transmission to perform transmission processing. On other occasions, each radio communication device uses common reception regions to perform transmission processing. Thus, a communication device which effectively makes information transmission in a network is obtained.

Further, in the wireless network of the present invention, each radio communication device performs reception processing in response to arrival of a reception region allocated to the device itself and a common reception region. Thus, receiving operation can be stopped in other regions. As a result, a radio communication method wherein the power consumption is reduced is obtained.

Further, in the wireless network of the present invention, information about reception regions allocated to individual radio communication devices and common reception regions in the network is acquired in advance. When information is transmitted, the time to transmit the information can be grasped based on the reception region information of the destination. Thus, transmission can be immediately made without performing such prior processing as connection check and reservation of a band in which communication is to be conducted.

The invention claimed is:

1. A first wireless communication device that communicates with a second wireless communication device, the first wireless communication device comprising:
a processor and a memory including instructions which, when executed by the processor, control to:
set a transmission interval of a beacon;
transmit a first beacon to the second wireless communication device and another wireless communication device;
set a first period in which the first wireless communication device can communicate with the second wireless communication device individually, the first period occurring in the transmission interval,
wherein the first beacon includes first timing information regarding the first period,
transmit a second beacon to the second wireless communication device and another wireless communication device;
set a second period in which the first wireless communication device can communicate with the second wireless communication device and the another wireless communication device, the second period occurring in the transmission interval,
wherein the second beacon includes second timing information regarding the second period; and
transmit a first signal, different than a beacon signal, addressed to the second wireless communication device at the first period and a second signal, different than a beacon signal, broadcasted to the second wireless communication device and the another communication device at the second period.

2. The first wireless communication device of claim 1, wherein the instructions, when executed by the processor, control receipt of the second beacon from the second wireless communication device.

3. The first wireless communication device of claim 1, wherein the first beacon includes second information indicating a plurality of periods.

4. The first wireless communication device of claim 3, wherein the second information indicates a plurality of first periods for reception allocated specifically respectively for the first wireless communication device and the second wireless communication device, in which the plurality of first periods are in contention access periods.

5. The first wireless communication device of claim 4, wherein the first wireless communication device and the second wireless communication device perform reception processing respectively only at the plurality of first periods specifically allocated thereto.

6. The first wireless communication device of claim 4, wherein the first wireless communication device performs a transmission processing operation utilizing the plurality of first periods specifically allocated to destinations of transmission in a direct communication network.

7. The first wireless communication device of claim 1, wherein the first beacon is at a start of a management frame.

8. A first wireless communication device that communicates with a second wireless communication device, the first wireless communication device comprising:
a processor and a memory including instructions which, when executed by the processor, control to:
receive information indicating a transmission interval of a beacon
receive a first beacon from the second wireless communication device and another wireless communication device, in which the first beacon is transmitted according to a transmission interval of the first beacon, and in which periods in which the second wireless communication device can communicate with the first wireless communication device occur at fixed intervals in said transmission interval,
wherein the first beacon includes timing information regarding a first period,
receive a second beacon from the second wireless communication device and the another wireless communication device;
set a second period in which the first wireless communication device can communicate with the second wireless communication device and the another wireless communication device, the second period occurring in the transmission interval,
wherein the second beacon includes second timing information regarding the second period; and
receive a first signal, different than a beacon signal, from the second wireless communication device at the first period and broadcast a second signal, different than a beacon signal, to the second wireless communication device and the another communication device at the second period.

9. The first wireless communication device of claim 8, wherein the instructions, when executed by the processor, control to transmit the second beacon to the second wireless communication device.

10. The first wireless communication device of claim 8, wherein the first beacon includes second information indicating the plurality of periods.

11. The first wireless communication device of claim 10, wherein the second information indicates a plurality of first periods for reception allocated specifically respectively for the first wireless communication device and the second wireless communication device, in which the first period is a contention access period.

12. The first wireless communication device of claim 11, wherein the first wireless communication device and the second wireless communication device perform reception processing respectively only at first period.

13. The first wireless communication device of claim 11, wherein the first wireless communication device performs a transmission processing operation utilizing the first period specifically allocated to destinations of transmission in a direct communication network.

14. The first wireless communication device of claim 8, wherein the first beacon is at a start of a management frame.

* * * * *